(12) United States Patent
Mayer et al.

(10) Patent No.: US 11,472,124 B2
(45) Date of Patent: Oct. 18, 2022

(54) SECURING A SECOND OBJECT TO A FIRST OBJECT

(71) Applicant: MultiMaterial-Welding AG, Stansstad (CH)

(72) Inventors: Jörg Mayer, Niederlenz (CH); Mario Lehmann, Les Pommerats (CH); Joakim Kvist, Nidau (CH); Patricia Poschner, Uettligen (CH); Patrick Mooser, Biel (CH)

(73) Assignee: MULTIMATERIAL-WELDING AG, Biel/Bienne (CH)

( * ) Notice: Subject to any disclaimer, the term of this patent is extended or adjusted under 35 U.S.C. 154(b) by 980 days.

(21) Appl. No.: 16/086,532

(22) PCT Filed: Mar. 21, 2017

(86) PCT No.: PCT/EP2017/056734
§ 371 (c)(1),
(2) Date: Sep. 19, 2018

(87) PCT Pub. No.: WO2017/162693
PCT Pub. Date: Sep. 28, 2017

(65) Prior Publication Data
US 2019/0126562 A1    May 2, 2019

(30) Foreign Application Priority Data

Mar. 21, 2016 (CH) ...................................... 00392/16
Jan. 10, 2017 (CH) ...................................... 00027/17

(51) Int. Cl.
*B29C 65/08*       (2006.01)
*F16B 5/01*        (2006.01)
(Continued)

(52) U.S. Cl.
CPC .............. *B29C 65/08* (2013.01); *B29C 65/48* (2013.01); *B29C 65/7437* (2013.01);
(Continued)

(58) Field of Classification Search
CPC .... F16B 5/01; F16B 13/141; B29C 66/72525; B29C 65/542
See application file for complete search history.

(56) References Cited

U.S. PATENT DOCUMENTS

| 4,027,370 A | 6/1977 | Bachar |
| 10,562,237 B2 * | 2/2020 | Mayer ................... B29C 66/524 |

(Continued)

FOREIGN PATENT DOCUMENTS

| CN | 102256766 | 11/2011 |
| CN | 106233002 | 12/2016 |

(Continued)

OTHER PUBLICATIONS

Switzerland Search Report dated Jul. 8, 2016, Application No. 3922016, 3 pages.
(Continued)

*Primary Examiner* — Carson Gross
(74) *Attorney, Agent, or Firm* — Rankin, Hill & Clark LLP

(57) ABSTRACT

A method of anchoring a connector in a first object, wherein the first object is a lightweight building element having a first outer building layer and an interlining layer, and wherein the connector includes thermoplastic material in a solid state. The method includes: bringing a coupling surface portion of the connector into contact with an attachment location of the first outer building layer; displacing a portion of the first outer building layer at the attachment location with respect to the interlining layer by applying a first pressing force to the first outer building layer and thereby
(Continued)

piercing the first outer building layer; applying a second pressing force to the connector and transferring energy to the connector until a flow portion of the thermoplastic material has liquefied and flown to interpenetrate structures of the interlining layer; and stopping the energy transfer and allowing the flow portion to re-solidify.

22 Claims, 18 Drawing Sheets

(51) Int. Cl.
| | |
|---|---|
| B29C 65/48 | (2006.01) |
| B29C 65/74 | (2006.01) |
| B29C 65/78 | (2006.01) |
| B29C 65/00 | (2006.01) |
| F16B 37/06 | (2006.01) |
| B29L 31/00 | (2006.01) |
| B29K 707/04 | (2006.01) |
| B29K 709/08 | (2006.01) |

(52) U.S. Cl.
CPC ...... *B29C 65/7844* (2013.01); *B29C 66/0222* (2013.01); *B29C 66/131* (2013.01); *B29C 66/3022* (2013.01); *B29C 66/3024* (2013.01); *B29C 66/30325* (2013.01); *B29C 66/30326* (2013.01); *B29C 66/474* (2013.01); *B29C 66/532* (2013.01); *B29C 66/71* (2013.01); *B29C 66/721* (2013.01); *B29C 66/72525* (2013.01); *B29C 66/7392* (2013.01); *B29C 66/81427* (2013.01); *B29C 66/81429* (2013.01); *B29C 66/8322* (2013.01); *B29C 66/9292* (2013.01); *B29C 66/92443* (2013.01); *B29C 66/92445* (2013.01); *B29C 66/92615* (2013.01); *B29C 66/92921* (2013.01); *B29C 66/9516* (2013.01); *F16B 5/01* (2013.01); *B29C 66/7444* (2013.01); *B29C 66/7465* (2013.01); *B29C 2793/0045* (2013.01); *B29K 2707/04* (2013.01); *B29K 2709/08* (2013.01); *B29L 2031/7278* (2013.01); *F16B 37/061* (2013.01)

(56) References Cited

U.S. PATENT DOCUMENTS

| | | | |
|---|---|---|---|
| 10,576,691 B2* | 3/2020 | Mayer | F16B 5/08 |
| 11,027,497 B2* | 6/2021 | Mayer | B29C 65/7437 |
| 11,084,226 B2* | 8/2021 | Poschner | B32B 37/146 |
| 2005/0126680 A1* | 6/2005 | Aeschlimann | B29C 66/7463 156/73.1 |
| 2007/0062628 A1* | 3/2007 | Aeschlimann | B29C 65/562 156/1 |

FOREIGN PATENT DOCUMENTS

| | | |
|---|---|---|
| DE | 10 2005 037 615 | 2/2007 |
| WO | 93/12344 | 6/1993 |
| WO | 98/42988 | 10/1998 |
| WO | 00/79137 | 12/2000 |
| WO | 2008/080238 | 7/2008 |
| WO | 2015/135824 | 9/2015 |
| WO | 2015/162029 | 10/2015 |
| WO | 2017/055548 | 4/2017 |

OTHER PUBLICATIONS

English translation of Chinese Office Action dated Oct. 10, 2020, Application No. 201780027396.0, 7 pages.
English translation of International Preliminary Report on Patentability dated Sep. 25, 2018 (Sep. 25, 2018), Application No. PCT/EP2017/056734, 7 pages.

* cited by examiner

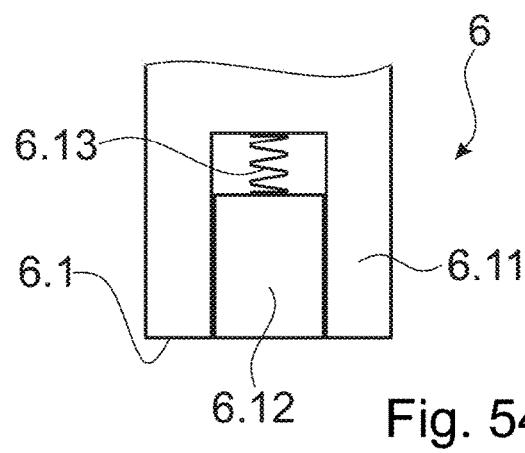
Fig. 54
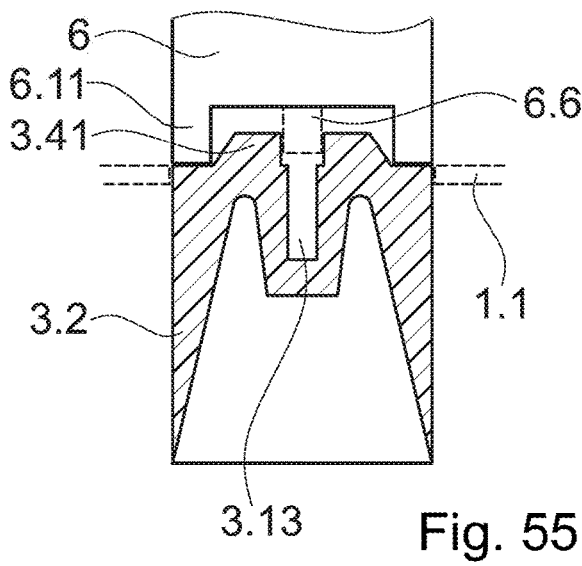
Fig. 55
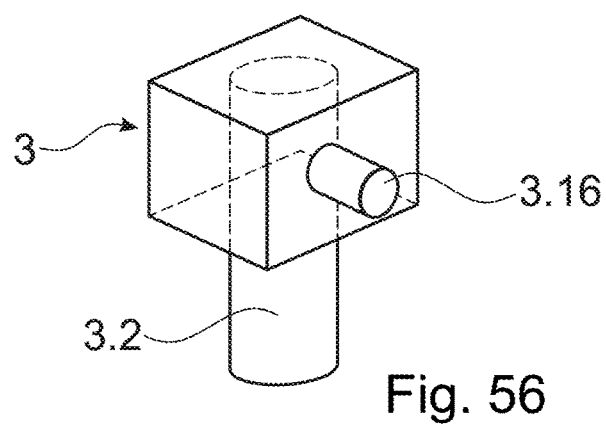
Fig. 56
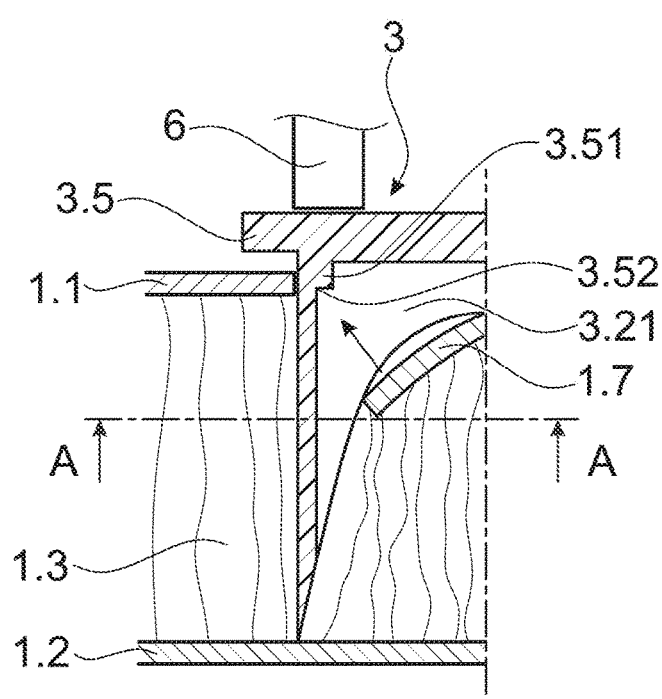
Fig. 57
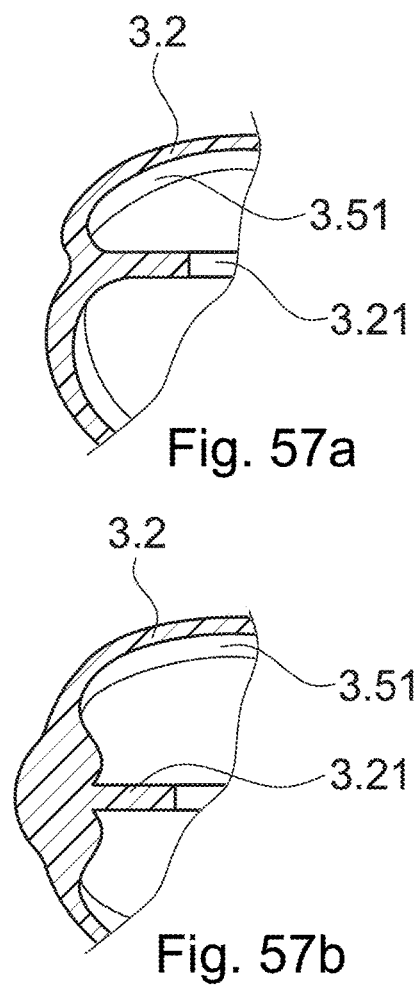
Fig. 57a
Fig. 57b

SECURING A SECOND OBJECT TO A FIRST OBJECT

FIELD OF THE INVENTION

The invention is in the fields of mechanical engineering and construction, especially mechanical construction, for example automotive engineering, aircraft construction, shipbuilding, machine construction, toy construction etc. In particular, it relates to a method of—mechanically—anchoring a connector in a first object.

BACKGROUND OF THE INVENTION

In the automotive, aviation and other industries, there has been a tendency to move away from steel-only constructions and to use lightweight material instead.

An example of new building material elements are lightweight building elements that comprise two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

The new materials cause new challenges in bonding elements of these materials—especially in bonding flattish object to an other object. An example for this is the bonding of reinforcements ("stringers" or the like) to flattish sandwich board constructions in the automotive, aviation, shipbuilding and other industries or for providing anchoring points for hinges, screws, bolts etc. in the sandwich board.

Further, according to the state of the art, reinforcements in sandwich board constructions have to be provided during their manufacture, and also connecting elements have to be added during manufacturing. If they are subsequently added, the sandwich core has to be foam-filled subsequently to fastening the connector, which is costly and time consuming.

To meet these challenges and eliminate possible disadvantages, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used. Further, because it is effective only at the surface, an adhesive bond cannot be stronger than a material strength at the surface. In a sandwich board, this is the material strength of one of the building layers, or of an outermost sub-layer thereof.

SUMMARY OF THE INVENTION

It is therefore an object of the present invention to provide a method of mechanically securing a connector to a first object, the method overcoming disadvantages of prior art methods. Especially, it is an object of the present invention to provide a method of mechanically securing a connector to a lightweight building element, which method has the potential of being low-cost, efficient and quick.

According to an aspect of the invention, a method of anchoring a connector in a first object is provided, wherein the first object is a lightweight building element having a first outer building layer (also called first building layer in this text) and an interlining layer, wherein the first outer building layer is thinner and more dense (and generally also harder as far as the—average—hardness of the interlining layer is defined) than the interlining layer, and wherein the connector comprises thermoplastic material in a solid state, the method comprising:

Bringing a distally facing coupling surface portion of the connector into contact with an attachment location of the first outer building layer;

displacing a portion of the first outer building layer at the attachment location with respect to the interlining layer by applying a first pressing force to the first outer building layer and causing the first outer building layer to be pierced (especially as a result of the application of the first pressing force) at the attachment location or in a vicinity thereof;

Applying a second pressing force to the connector and transferring energy to the connector, and thereby moving the connector into a distal direction relative to the first object until a flow portion of the thermoplastic material has liquefied and flown to interpenetrate structures of the interlining layer;

Stopping the energy transfer and allowing the flow portion to re-solidify.

Especially, if the first building layer defines a plane around an attachment location, the method may comprise displacing the first building layer with respect to the plane at the attachment location towards a distal direction.

In the step of displacing, a displaced portion of the first outer building layer may be separated from the first outer building layer, i.e. the first outer building layer in the process is disrupted as opposed to being merely deformed. In embodiments, the displaced portion may, however, remain contiguous, i.e. be separated from the first building layer and displaced as a whole. This does not exclude the possibility that the displaced portion is also deformed in addition to being separated from the first outer building layer and to being displaced.

Especially, the step of displacing may comprise punching out or breaking out the displaced portion from the first outer building layer.

To this end, the connector may comprise a distally facing punching surface portion (sometimes referred to as 'punching edge' in this text, such punching edge may be sharp but does not need to be so, depending on the first building layer material also a flat end constituting the punching surface portion may have a punching effect). Such punching surface portion may form an uninterrupted or interrupted contour along which the punching takes place. In many embodiments, the geometry of the connector is such that a hollow space is formed within the contour when the connector abuts against the first building layer, i.e. the connector has a distal portion that is approximately tube shaped. In this, this tube portion may have a circular cross section or an other cross section and may have a constant wall thickness or a not constant, for example tapering, wall thickness.

The step of displacing the portion of the first outer building layer according to a first option may be carried out after the step of bringing the coupling surface portion of the connector into contact with the first building layer, namely by applying the first pressing force to the connector resting against the first outer building layer. In embodiments of this first option, during the step of applying the first pressing and/or punching force to displace the portion of the first outer building layer, the connector may be subject to energy, such as mechanical vibration energy. In embodiments, the amplitude of the mechanical vibration and/or the power may be higher during this step of displacing than during the subsequent step of applying the second pressing force; alternatively it may be the same or even lower.

According to an other aspect, therefore, the invention concerns a method of anchoring a connector in a first object, wherein the first object is a lightweight building element having a first outer building layer and an interlining layer, the first outer building layer being thinner and more dense than the interlining layer, wherein the connector comprises thermoplastic material in a solid state, the method comprising the steps of:
  Bringing a distally facing coupling surface portion of the connector into contact with an attachment location of the first outer building layer;
  Simultaneously coupling a first pressing force and mechanical vibration energy into the connector until the first outer building layer is pierced by the connector at the attachment location or in a vicinity thereof;
  Applying a second pressing force to the connector and transferring energy to the connector, and thereby moving the connector into a distal direction relative to the first object until a flow portion of the thermoplastic material has liquefied and flown to interpenetrate structures of the interlining layer;
  Stopping the energy transfer and allowing the flow portion to re-solidify.

In accordance with a second option, the step of displacing the portion of the first outer building layer may be done previously to the step of bringing the connector into contact with the first building layer, namely by a separate pressing tool. Such pressing tool may displace the portion of the first indentation by pre-making a shallow indentation (with disrupting the first building layer around the attachment location) or by punching a portion of the first building layer at the attachment location. Such pressing tool may also be used to displace a portion of the first indentation by pre-making an indentation without disrupting the first building layer. Then, nevertheless a first pressing force is applied thereafter, according to the first option, via the connector, until the first building layer is pierced.

Combinations of the first and second options are readily possible, i.e. in a first sub-step, the portion may be displaced by a pressing tool, then the connector may be brought into contact with the first building layer, and then a second sub-step of further displacing the portion may be carried out by pressing the connector against the first building layer.

In embodiments, the connector may be provided with a distal piercing and/or punching structure. Especially, the connector may comprise a distal punching profile following, with or without interruption, a punching contour, for example a circular contour. For example, the connector may have an essentially tube-like distal portion.

In embodiments, the connector geometry may be such that towards the distal end it is hollow; sleeve-like, with the sleeve-like portion (tube portion) extending distally from a body. Such body in embodiments may form a head portion.

More in general, the connector will often have a punching edge of the mentioned kind that may circumferential or interrupted and may run along the outermost periphery of the connector or may alternatively be offset towards radially-inward (arranging the edge along the outermost periphery has the potential advantage of adapting the created void in the first building layer to the connector geometry, while a slight outward taper or a small outer step has the advantage of contributing to an interference fit of the connector in the first building layer and thereby increasing the stability of the proximal and face of the final assembly.

The connector does not necessarily have a round cross section. Rather, it may have a different shape, for example elongate, polygonal, T-shaped. H-shaped, U-shaped, etc.

In a special group of embodiments, the connector is provided with a collapse zone allowing a part distally of the collapse zone to be deformed relative to the rest of the connector (first type collapse zone, zone for distal collapse). Especially, such portion may be caused to be bent outwardly from the collapse zone on, so that the connector gets a larger footprint. Such collapse zone may be formed by a zone of reduced cross section, for example in according embodiments by a zone of reduced sleeve thickness running around the sleeve-like portion.

In many embodiments, the connector needs to be relatively precisely positioned relative to the first object when it is anchored in the first object.

In accordance with a first group of embodiments, for this purpose the first object and the connector have structures adapted for this purpose when the connector is brought into contact with the first object. Especially, the first object may be provided with a guiding hole (positioning hole)—that extends for example at least through the first building layer—and the connector may comprise an accordingly shaped guiding portion that protrudes distally further than the structure (for example punching structure) that during the process displaces the portion of the first building layer. Especially, the guiding portion may comprise a pin-like structure—symmetrical or asymmetrical with respect to rotations around the insertion axis.

Such guiding structure may form part be collapsible in the above sense, i.e. the part of the connector that carries the guiding structure collapses during the process whereby the guiding structure is retracted and/or consumed away during the process. Thereby, the distal end of the guiding structure may be the distal-most portion of the connector initially, but when the distal end of the connector gets close to an inner surface of the second building layer (if any) other portions of the connector, especially with a larger footprint than the usually relatively thin guiding portion forms the distal end, or part thereof, where most energy is absorbed.

In embodiments of this first group, the positioning of the sonotrode (or other element that couples the pressing force into the connector) relative the connector is not critical even if the connector has to have a precisely defined position. For example a sonotrode—or other pressing tool—having a substantially flat distal end face may be used.

In accordance with a second group of embodiments, the tool by which the connector is pressed into the distal direction (sonotrode or other pressing tool) may be used to define the position of the connector during the anchoring process. Then, the tool may have a position precisely defined with respect to the first object, for example by belonging to an apparatus that holds the first object. The tool may further have a guiding structure cooperating with a connector guiding structure to guide the connector. In an example, the sonotrode comprises a guiding protrusion engaging with a guiding indentation of the connector.

In many embodiments of configurations with a connector, a tool and an object in which the connector is to be anchored, it should be ensured that no coupled restricted guidance (no over-determination of the guidance) is present, i.e. for example if both, the tool (sonotrode) and the object have a determined position, only one of the tool and of the object may define the lateral position of the connector and not both. Otherwise, uncontrolled melting can occur. If the energy is mechanical vibration energy, this is particularly easy to achieve, because of the vibration, absent any positive guidance lateral friction forces are, very small, so that a decoupling is readily achievable. Thus, in embodiments, the guidance of the connector should be done by one of the tool, the object, or an external guidance.

The connector comprises the thermoplastic material. In embodiments, the connector consists of thermoplastic material.

In other embodiments, the connector in addition to the thermoplastic material comprises a body of a not liquefiable material.

In embodiments with a not liquefiable body, the body of the not liquefiable material is different from a mere filler of a large number of particles but is a macroscopic body with a defined position and orientation and of a substantial size of for example at least 10% of a connector volume, and/or with a characteristic dimension of at least 0.1 mm in any dimension. Especially, the body may be metallic or of ceramics. Especially, the body may be such as to have a defined shape and to thereby add stiffness to the connector. By the body, the connector is defined into at least two spatially separated regions, namely the body region and the thermoplastic region.

Such a body of not liquefiable material may carry structures serving for further functions, such as a thread, an other mechanical connection, a contact or feedthrough, etc.

In embodiments, the body has a surface with at least one locking feature on a lateral surface, which locking feature cooperates with thermoplastic material the body to stabilize the relative position of the body, within embedding thermoplastic material.

In embodiments, in which the connector in addition to the thermoplastic material comprises not liquefiable material, the thermoplastic material may be arranged at least on surface portions that come into contact with the interlining layer. Alternatively, the thermoplastic material may be arranged or arrangeable in an interior, and the body may comprise a fenestration through which the thermoplastic material may be pressed out to be brought into contact with interlining layer.

In accordance with both options, the step of displacing may comprise displacing the portion towards a distal direction, thereby causing material of the interlining distally of the portion to be compressed. It has been found, that such compression of the interlining may lead to additional anchoring stability Especially, in embodiments of both options, the first building layer may be caused to be punched as an effect of the first pressing force. The portion that is displaced in the step of displacing may then be punched out and displaced into a distal direction relative to the remaining portions of the first building layer.

In accordance with the hereinbefore discussed first option, the step of displacing the portion of the first outer building layer is carried out after bringing the connector into contact with the first object, especially by the connector. In these embodiments, if the first object is a sandwich-type lightweight building element with the interlining sandwiched between the first building layer and a second building layer, the challenge may exist that the first building layer is to be disrupted by the connector but the second building layer—which may be structured similarly or even identically to the first building layer—needs to remain intact.

In accordance with a first possibility to do so, the process is carried out with a distance control, i.e. the (second) pressing force is stopped as soon as the connector has reached a pre-defined position so that it can be excluded that the connector also pierces the second building layer. The first possibility is especially an option for first objects in which the interlining layer provides sufficient resistance to the pressing force so that sufficient energy is absorbed when the connector penetrates into interlining material—and/or if other energy than mechanical energy is coupled into the connector.

In addition or as an alternative, in accordance with a second possibility, the connector may be equipped for protecting the second building layer even if the distal end of the connector during the final stage is pressed against the second building layer.

For example, in embodiments the piercing and/or punching structure may be of the not-liquefiable portion. Then, the connector may be equipped for the not-liquefiable portion to retract relative to the thermoplastic material portion while the connector progresses through the interlining material, so that when the second building layer is reached, the piercing and/or punching structure does not constitute the distal end anymore and/or the pressing force is not coupled into the not-liquefiable portion any more. For example, the not liquefiable portion may comprise a proximally facing energy directing structure embedded in the thermoplastic material, whereby after sufficient energy absorption the thermoplastic material surrounding the energy directing structure is plastically deformable and allows for the not-liquefiable portion to be displaced towards proximally relative to the thermoplastic material.

In accordance with another example, the distal end comprising the piercing and/or punching structure is collapsible. Especially, the distal end comprising the piercing and/or punching structure may comprise a plurality of legs that are initially stabilized but during the process may be caused to be deformed, for example towards outwardly. A side effect of this approach is that the footprint of the anchoring is automatically enhanced by the outwardly extending legs.

In addition or as an alternative to the distal end being collapsible, the connector may comprise a collapse zone that is configured to collapse in a more proximal region, especially in a region that after the step of applying the second pressing force is immediately distally of the first outer building layer, whereby material displaced in the collapse zone may be displaced outwardly underneath (distally of) the first outer building layer (second type collapse zone; proximal collapse zone).

In general, the method may comprise the step of causing, by the effect of the energy and the second pressing force and/or, if applicable, the third pressing force, thermoplastic material of the connector to be made flowable and to flow radially outwardly into a region distally of the first building layer, especially immediately distally of (for example in physical contact with) the first building layer. Thereby, after re-solidification, this thermoplastic material may cause a blind rivet effect with the connector being secured against pulled out towards proximally by this thermoplastic material and the first building layer.

In addition or as yet another alternative to the second type collapse zone, the connector may comprise a temporal stabilizer structure that prevents the distal portion comprising the distally facing surface portion of the connector from collapsing in an initial stage. In an example, the stabilizer structure comprises at least one rib, for example extending essentially parallel to the axial direction. Such stabilizer structure has the effect of stabilizing the distal portion of the connector, for example a tube portion, during the initial stage of displacing a portion of the first outer building layer and initially during advancing the connector into the first object by the second pressing force—even if the distal portion is comparably weak, for example by being constituted by relatively thin walls. The stabilizer structure may prevent buckling or similar effects.

In embodiments, the stabilizer structure may be arranged to cause an outward pressing force as a result of the connector advancing towards distally into the first object, which outward pressing force is a result of the stabilizer structure and the compacting interlining layer material together are subject to elastic resistance forces. Such outward pressing force has the effect of causing displacement of liquefied and/or not yet liquefied thermoplastic material towards outwardly, for example underneath (distally of) the first outer building layer. Such outward displacement after re-solidification of the thermoplastic material enhances the anchoring strength.

In embodiments (with or without the stabilizer structure), the connector may be shaped so that the punched-out displaced portion assists or causes cause an outward pressing force for displacing connector material outwardly. Especially, the connector may be shaped so that the displaced portion causes an outward relative pressing force when it encounters a resistance against displaced towards further distally. Such resistance will be caused by the interlining layer that is compacted, as explained above. A relatively stiff surface of the displaced portion, which is due to the density/mechanical strength of the first outer building layer, by this may be used for assisting the anchoring process.

In accordance with a further example, the distal end comprising the piercing and/or punching structure is caused to be sufficiently liquefied for the distal end to not have any piercing and/or punching functionality any more when the second building layer is reached. This may for example be the case of the piercing and/or punching structure is formed by a relatively thin tube portion or similar.

In accordance with an even further example, the shape of the piercing and/or punching structure is adapted to the first object material so that the first object material shields the piercing and/or punching structure before the second building layer is reached. For example, the piercing and/or punching structure may be constituted by an annular, tube-like distally facing protrusion having an extension smaller than or equal to a thickness of the first building layer. Thereby, the punched-out portion of the first building layer fills the space encompassed by the tube-like protrusion and thereby shields the distal end thereof.

In further examples, the features of these examples may be combined.

In a group of embodiments, the connector is shaped so that the first building layer after the punching/piercing step is involved in the process of making thermoplastic material of the connector flowable, especially portions that are located in a proximal region and that are caused to flow into a region immediately distally of the first building layer.

To this end, the connector may have a distal portion with an outer surface that is essentially cylindrical or slightly conical (cylindrical in this text means having translational symmetry along the axis; which includes but is not restricted to rotational cylinders). An axial extension of this distal portion at least corresponds to a thickness of the material (first building layer, possibly other stiff material portions underneath) that needs to be punched. In addition, the connector has a more proximal portion proximally of this distal portion, which more proximal portion has an outwardly protruding feature where the connector becomes broader as a function of the position along the axis, especially a step or a taper. Thereby, when the connector is pressed further into the first object, this outwardly protruding feature gets into contact with the edge of the first building layer along the punching line.

Especially, the method therefore may comprise causing a radially outer portion of the connector to be pressed against an edge of the remaining first building layer after a portion of the first building layer has been punched out of it, while the energy is coupled into the connector, until thermoplastic material of the connector is made flowable at an interface between the edge and the connector and is caused to flow relative to the connector and the edge.

In these embodiments, the outer surface of the connector does not have to be homogeneous. Instead, it may for example comprise axially running tapered ridges, for example protruding from a cylindrical surface. An intensified heating of the thermoplastic material of these ridges—that may serve as energy directors if the energy is mechanical energy—may cause a transfer of heat to the inner, for example cylindrical, portion and thereby a collapse of the connector during the last phase of the anchoring process may be provoked.

Independent of whether the outer surface of such radially outer portion is homogeneous (for example conical) or comprises discrete protrusions, such as ridges, a taper angle or step size of such radially outer portion may depend on a stiffness of the first building layer—the stiffer the first building layer, the smaller the taper angel to cause a sufficient heat input.

An quantity that may be important is the bending rigidity of the first building layer. This quantity may depend on material properties and thickness of the first building layer itself as well as on the compression resistance of the interlining.

The displaced portion may be initially flattish and perpendicular to the proximodistal direction. It may optionally remain essentially flattish and oriented perpendicular to the proximodistal direction.

Especially, the displaced portion may have an extension corresponding to a full cross section of the connector.

The energy transferred to the connector may be mechanical vibration energy. To this end, the connector may have a proximal, proximally facing coupling-in face that cooperates with a vibrating object, namely a sonotrode, during the step of causing energy to impinge.

The liquefaction of the flow portion in this is primarily caused by friction between the vibrating connector and the surface of the first object, which friction heats the connector and possibly also the first object superficially.

In a group of embodiments, the connector and/or a portion of the first object against which the connector is pressed comprises, at the mutual interface, structures serving as energy directors, such as edges or tips, such as energy directors known from ultrasonic welding or for the "Woodwelding" process as for example described in WO 98/42988 or WO 00/79137 or WO 2008/080 238.

For coupling mechanical vibrations into the connector, the connector may comprise a coupling-in structure. Such a coupling-in structure may be a coupling-in face, especially, constituted by a proximal-most end face, with or without guiding structures (such as a guiding hole for an according protrusion of the tool), for a sonotrode. The region where the coupling-out face of the sonotrode is in physical contact with the coupling-in face of the connector is called "contact face" in this text.

In a group of embodiments, the shapes of the sonotrode and of the connector are adapted to each other so that the contact face is restricted to regions the in-plane position (radial/circumferential position with respect to the axis) of which corresponds to positions of the distally facing surface portion and their environment. In other words, the pressing forces are only coupled into the connector at positions where the connector extends to the distal end so that the pressing forces are transmitted straight to the distal end, with primarily axial forces coupled into the connector. Especially, if the connector has a tube portion extending towards distally, the contact face may be restricted to a ring, especially having an average radius approximately corresponding to the average radius of the ring.

By this measure, the stability of the connector during the process with respect to deformations of a central, for example functional portion may be enhanced.

In embodiments, especially if the interlining layer is comparably strong and will cause substantial mechanical resistance against a displacement towards distally, a central portion of the connector may be de-coupled from a peripheral portion that comprises the tube portion. Such de-coupling may for example by realized by a joint structure between the peripheral portion and the central portion. Only the peripheral portion will be subject to the (second) pressing force and the energy input. By this further measure, energy input into the central portion will be minimized and deformation of the central portion, for example by softening of thermoplastic material of the central portion, will be prevented. The joint structure will nevertheless transmit the necessary forward pushing force on the central portion.

For the contact face to be restricted, to certain areas, the sonotrode may comprise an protrusion the distal end of which forms the coupling-out face. For example, the sonotrode may comprise a peripheral protrusion running around the sonotrode periphery. In addition or as an alternative, the connector may comprise a corresponding protrusion.

In a special sub-group of embodiments, the sonotrode has a protrusion defining the contact face, and the connector has a proximal protrusion with a proximal end face proximally of the contact face. The sonotrode and the connector are adapted to each other so that the proximal end face does not form part of the contact face, i.e. the proximal end face is not loaded by the energy input (and for example also not loaded by the first and/or second pressing forces). Thereby, possible bulges formed next to the contact face during the process because of energy absorption at the interface do not have any influence on the definition of the proximal end of the connector. This may be advantageous in embodiments where the proximal end face of the connector needs to be defined and for example servers as abutment face for some other object secured to the first object.

Other forms of energy are not excluded, for example radiation energy that is coupled in through the connector and absorbed at the interface to the first object.

In many embodiments, the first pressing force is larger than the second pressing force. This is due to the fact that the mechanical resistance of the interlining layer will tend to be considerably smaller than the mechanical resistance of the first building layer. In embodiments that comprise applying the first pressing force by (via) the connector, the machine carrying out the method is programmed to switch from applying a larger, first pressing force to a smaller, second pressing force as soon as the first building layer has been pierced through by the connector. This is not a behavior coming about automatically when a pressing force is applied by pneumatic means or other standard means. Rather, the machine is provided with dedicated means for doing so, for example A sensing mechanism for sensing the forward-movement-vs.-pressing-force-response. As soon as this mechanism senses a drop of the mechanical resistance against a forward movement, the machine switches from applying the first pressing force to applying the second, smaller pressing force. In addition or as an alternative, the acoustic properties of the system "connector-first object" may be used to sense the mechanical resistance (resonance properties, energy absorption); this information may be taken from a feedback loop controlling the application of the mechanical vibration energy.

A mechanism for applying the pressing force dependent on the position. As soon as the tool, by which the pressing force is applied to the connector, has reached a position corresponding to a position in which the connector has pierced through the first building layer, the machine switches from applying the first pressing force to applying the second, smaller pressing force.

A direct sensor detecting when the first building layer has been pierced through by the connector, for example optically; this includes the possibility of using a camera and image processing. As is generally the case, also in this, the machine switches from applying the first pressing force to applying the second, smaller pressing force as soon as it has been detected that the connector has pierced through the first building layer.

In many embodiments of the group that comprises applying the first pressing force via the connector, during the step of applying the first pressing force, also energy is coupled into the connector. This energy may be mechanical vibration energy. In embodiments, the amplitude and/or the frequency of the mechanical vibration may optionally be different from the amplitude/frequency applied during the step of applying the second pressing force. Especially, the amplitude and/or the mechanical vibration power may optionally be higher during the step of applying the first pressing force than during the step of applying the second pressing force.

More in general, the amplitude of the mechanical vibration may be subject to a specific amplitude modulation profile during the process. In embodiments, during the step of applying the second pressing force, the mechanical vibration energy is applied in a pulsed manner.

The first building layer may be comparably hard and essentially non-porous so that it does not comprise any structure or only little structure penetrable by the thermoplastic material for anchoring the connector in the first building layer after re-solidification of the thermoplastic material. It has nevertheless been found that applying the mechanical vibration already during the stage of applying the first pressing force may be beneficial for an improved anchoring of the connector distally of ("underneath") the first building layer. This may be attributed to the following facts: In thermoplastic material, internal friction is higher for larger temperatures, especially if at a temperature above the glass transition temperature compared to a transition below the glass transition temperature. If vibration is applied already during penetration of the first building layer, this will lead to heating of the thermoplastic material, whereby the material becomes softer and will have more internal friction when subject to the mechanical vibration, whereby it becomes a better absorber of the mechanical vibration energy. When the material in the subsequent step is then in contact with the interlining material—which due to its properties exhibits substantially less resistance and will thus lead to less external friction—due to this initial heating the overall energy absorption will be sufficient to continue the heating an liquefaction process of the connector thermoplastic material being within the interlining layer. Even though the interlining is comparably soft, it has been observed that if the flow portion is sufficiently large, this will lead to a strong anchoring, in the interlining material.

As an alternative to having a first building layer of a hard, non-porous material, the first object may have a first building layer that is more pliant. For example, the first building layer may be fleece-like, for example of wood/Polypropylene (PP) or of even only partially consolidated glass fiber-PP composite.

In embodiments, the anchoring of the connector in the first object may comprise a weld between material of the connector and material of the first and/or (if applicable) second outer building layer, in addition to the anchoring by interpenetration of interfibrous open spaces by the thermoplastic material.

More in general, the first building layer may, in embodiments, have thermoplastic properties. This may be used for at least one of the following:

When during an initial stage of applying the first pressing force also energy id coupled into the connector, the first building layer may locally be heated and thereby become softened, whereby the first pressing force may be chosen to be relatively small. In addition or as an alternative, amplitude of the vibration (if the energy is vibration energy) or generally the input power may be chosen to be relatively small until the first building layer has been penetrated, especially without causing the distal end of the connector itself to become soft. After the piercing (penetration), the pressing force and/or the amplitude/power may be raised so that the liquefaction process of material of the connector may set in.

In the last phase of the anchoring process, thermoplastic material of the connector may be caused to weld to the first outer building layer.

In embodiments, the connector may have a proximal broadening, such as a head or similar, that forms a fusion structure that is located and shaped to be pressed against the first outer building layer towards the end of the anchoring process and to thereby become liquefied and interpenetrate structures of the first outer building layer and/or to fuse with material of the first outer building layer and/or of the interlining layer so as to form a weld.

Such fusion structure may comprise an edge, for example a circumferential edge.

In addition or as yet another alternative, the materials of the connector and of the interlining layer may be chosen so that anchoring comprises a weld between material of the connector and thermoplastic material of the interlining layer, as explained further hereinafter.

In a group of embodiments, the method features the additional step of applying a third pressing force, which is larger than the second pressing force and may be smaller than the first pressing force, after the step of applying the second pressing force and prior to stopping the energy transfer and/or after stopping the energy transfer but before the flow portion has fully re-solidified. Such third pressing force may be applied as soon as the distal end of the connector comes into contact with a second building layer distally of the interlining layer, or with an attachment layer at the interface between such second building layer and the interlining layer material (such attachment layer in practice extends into the space of the interlining material and is deemed to belong to the interlining layer in this text. Optionally, during applying the third pressing force, the amplitude of the mechanical vibration may be set to a third value, different from the amplitude applied during the second-pressing-force stage.

However, generally the second pressing force, and if applicable, the third pressing force, will be chosen so that the second outer building layer is not penetrated by the connector. The second outer building layer may remain intact, without substantial deformation.

In a group of embodiments, the connector comprises a head portion or other laterally protruding proximal feature. Such laterally protruding feature may serve as stopping feature, i.e. the energy input (especially the mechanical vibration) may be stopped as soon as a distally facing shoulder of the head portion (or other laterally protruding proximal feature) comes into physical contact with the first building layer or with the proximal surface of a second object to be bonded to the first object by the connector.

A second object to be bonded to the first object may optionally comprise a generally flat sheet portion with an opening. Such sheet portion may lie directly against the proximal surface of the first building layer and be in physical contact with it. Alternatively, a further part, such as a thin sheet or membrane, may be placed between the first object and the sheet portion. The opening, through which the connector extends after the process, may be a through opening or may be a recess that is open to a lateral side (such as a slit or similar).

In embodiments, bonding such second object to the first object may comprise at least one of the following measures:

The second object around the opening has a section projecting away from a plane of the first building layer towards proximally, and a portion of the connector—for example a peripheral laterally protruding feature (collar/head or similar)—towards the end of the anchoring process comes into contact with the edge, whereby energy (for example vibration energy) coupled into the connector causes a portion of the thermoplastic material to be made flowable due to friction heat generated between the edge and the thermoplastic material, and the flowable material flows around the edge to at least partially embed the edge in the thermoplastic material. Thereby, an additional connection and, depending on the geometry of the edge and of the connector, also a sealing is achieved, substantially as described in PCT/EP2016/073422.

The second object has thermoplastic material where in contact with the first building layer, and at least a portion of this thermoplastic material is caused to flow relative to the first building layer, whereby a structure of the surface of the first building layer is interpenetrated and/or a weld is formed with material of the first building layer, so that an additional connection and possibly also a sealing is achieved.

Between the laterally protruding feature of the connector and the proximal surface of the second object and/or between the second object and the first building layer, and adhesive is placed. Such adhesive may be a curable adhesive. Due to the effect of mechanical vibration by which the energy is coupled into the connector, the viscosity may initially become reduced so that the adhesive may flow into structures of the first object, the second object and/or the connector. In addition or as an alternative, the mechanical vibration may accelerate the curing process. In addition or as an alternative to a curable adhesive, also a thermoplastic adhesive (hot melt adhesive) may be used.

Flowable and re-solidified material of the connector causes a positive-fit connection with the second object, for example in that the opening in the second object is not rotationally symmetrical, whereby a positive-fit with respect to rotational movements is created.

As an alternative to having a head portion of the described kind, a connector may be shaped to be inserted until an a proximal surface of the connector is flush with a proximal surface of the first building layer, or until at least a portion of the connector's proximal surface is flush with a proximal surface of the first building layer. The method may then comprise applying the second pressing force (and/or, if applicable, the third pressing force) until at least a portion of the connector's proximal surface is at least approximately flush with a proximal surface of the first building layer.

In embodiments, the connector may have a proximal collar-like protrusion protruding towards radially outward and shaped to be pressed against the edge of the remaining first building layer so as to seal off the connector with respect to the first building layer.

Especially, a functional portion of the connector, such as a fastener receiving portion (that may for example comprise a threaded hole open to proximally), may be arranged so that after the anchoring process it is distally of the proximal surface of the first building layer, i.e. is "within" the first object.

In all embodiments, the method may comprise the additional step of maintaining a pressing force for some time after the step of stopping the energy transfer. This may be done at least until the flow portion has lost its capability of flowing, which, depending on the dimension of the connector and on heat conducting properties of the first object, may be the case within typically a few seconds.

Generally, the connector may be a classical connector for connecting a second object to a first object. To this end, the connector, as mentioned, for example may comprise a head portion that defines a distally facing shoulder so that a second object having an opening through which the connector reaches is clamped between the first object and the head portion. Alternatively, the connector may comprise a connecting structure, such as an inner or outer thread, a bayonet coupling structure, a structure allowing a click-in connection or any other suitable connecting structure. In these cases, the connecting structure may optionally be formed as part of a portion of the connector which portion is not of the thermoplastic material.

In addition or as an alternative to being such a classical connector, the connector may be an integral part of a second object that itself has a dedicated function—for example, the connector may be a connecting peg protruding from a surface of such second object. The connector may also connect a comparably small further object to the first object, for example a sensor or actuator or light source and/or other element, which further object may be integrated in the body of the connector.

Especially in a group of embodiments, the connector may comprise addition to the anchoring structure, a functional structure. Such functional structure may be a connecting structure defining a connecting location, especially a connecting location defined with respect to all dimensions (x,y.z). Especially, the functional structure (the connecting location if the functional structure is a connecting structure) may be off-center with respect to an insertion axis so that the orientation of the connector around its insertion axis (generally the proximodistal axis that may be central with respect to the anchoring structure) determines the position and orientation of the connecting location. In this, the functional structure is for example different from a fastening hole (with our without a thread) coaxial with the axis, from a coaxial peg or threaded bar protruding towards proximally, from a head, etc. or any other conventional fastening structure of a known fastener.

The method may comprise anchoring the connector relative to the first object in a well-defined x, y and z position, and, in the mentioned examples, orientation.

To this end, one or more of the following measures may be implemented:
  The tool by which the second pressing force is applied comprises a position control that stops the process when the connector has reached a well-defined z position.
  The connector has a distally facing abutment face, and the process stops in a condition in which the abutment face rests against a corresponding proximally facing structure of the first object. This may for example be the case if the mechanical resistance against a further forward movement has reached a certain value (force control).
  The connector has a not rotationally symmetric (about the insertion axis) guiding structure cooperating with a corresponding structure of the tool to define the orientation.
  The connector has a distal guiding structure that is not rotationally symmetric about the insertion axis and that cooperates with an according not rotationally symmetric positioning hole of the first object.

In addition or as an alternative, the connector may comprise a plate-like body portion from which the anchoring portion protrudes towards distally, and proximally whereof the connecting structure is arranged, wherein the body portion comprises a proximally facing coupling-in face into which during anchoring the pressing force (and, if applicable, the mechanical vibration energy) is/are coupled. The coupling-in face in embodiments may be arranged immediately proximally of the anchoring portion, i.e. the pressing force and the vibration energy are coupled straight through the body portion, without any need to divert.

More in general, the functional portion that comprises the functional structure may comprise a distally facing abutment structure, wherein the step of applying the second pressing force is carried out until the abutment structure abuts against a proximal surface portion of the first object. Such abutment structure may be the distal surface of a plate-like body portion, or it may be constituted by an other feature of the functional portion. The abutment portion defines a separation plane between the distal anchoring portion and the proximal functional portion.

Embodiments implementing the aspect of a connecting structure in addition to the anchoring structure are not restricted to embodiments that implement the first aspect and/or the second aspect, i.e. embodiments include embodiments that do not punch out or break out a portion of the first outer building layer and embodiments in which the first object is not necessarily a lightweight building element with an interlining layer.

Especially, embodiments of this aspect include embodiments where the method includes the step of making a bore into a first outer building layer prior to the step of bringing the connector into contact with the first object, wherein the bore in the first outer building layer may have a diameter approximately corresponding to the diameter of the diameter of the anchoring portion. In other words, whereas making a pilot hole is an option for all kinds of embodiments, including the first and second aspects of the invention, embodiments of this further, third aspect include embodiments in which the resistance encountered by first outer building layer against penetration by the connector is overcome not by displacing but by locally removing the first outer building layer.

The first object, the connector, and, if applicable, the second object are construction components (construction elements) in a broad sense of the word, i.e. elements that are used in any field of mechanical engineering and construction, for example automotive engineering, aircraft construction, shipbuilding, building construction, machine construction, toy construction etc. Generally, the objects as well as the connector will all be artificial, man-made objects. The use of natural material such as wood-based material is thereby not excluded.

The flow portion of the thermoplastic material is the portion of the thermoplastic material that during the process and due to the effect of the mechanical vibrations is caused to be liquefied and to flow. The flow portion does not have to be one-piece but may comprise parts separate from each other, for example at the distal end of the connector and at a more proximal place.

For applying a counter force to the pressing force, the first object may be placed against a support, for example a non-vibrating support. According to a first option, such a support may comprise a supporting surface vis-à-vis the spot against which the connector is pressed, i.e. distally of this spot. This first option may be advantageous because the bonding can be carried out even if the first object by itself does not have sufficient stability to withstand the pressing force without substantial deformation or even defects. However, according to a second option, the distal side of the first object may be exposed, for example by the first object being held along the lateral sides or similar.

In embodiments, the first object is placed against a support with no elastic or yielding elements between the support and the first object, so that the support rigidly supports the first object.

The interlining layer may for example comprise a macroscopic, dedicated structure with a large portion of hollow spaces, whereby the density of the interlining layer is comparably small. For example, the interlining layer may comprise vertically extending walls (walls extending parallel to the axis) between the first and second outer building layers. In embodiments, such walls form a honeycomb structure More generally, in embodiments, the interlining comprises a portion of a material that is penetrable by the thermoplastic material. Therein, in the step of causing the flow portion to flow comprises causing material of the flow portion to penetrate into the structures, whereby, after re-solidification, a positive-fit connection between the connector and the first object is achieved. In case the interlining layer comprises thermoplastic material, for example as impregnation material of a honeycomb structure, it is not excluded that additionally a weld is generated by the thermoplastic materials of the connector and of the interlining.

There also exist lightweight building elements that are suitable as first objects for the present invention and that have an interlining layer comprising a structure of thermoplastic walls, such as a thermoplastic, for example Polypropylene-honeycomb structure.

Apart from this, the material of the interlining suitable for the process may be solid at least under the conditions of the method according to the invention. It further comprises (actual or potential) spaces into which the liquefied material can flow or be pressed for the anchoring. Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material which can be forced out of the pores, a composite of a soft material and a hard material or a heterogeneous material in which the interfacial adhesion between the constituents is smaller than the force exerted by the penetrating liquefied material. Thus, in general, the penetrable interlining material comprises an inhomogeneity in terms of structure ("empty" spaces such as pores, cavities etc.) or in terms of material composition (displaceable material or separable materials). As mentioned hereinbefore, it is possible that a weld is generated between material of the connector and material of the interlining layer. In these embodiments, those material portions of the interlining layer that contribute to the weld do not remain solid but are made flowable to an extent sufficient to form the weld.

This may optionally be supported by reducing the advance movement velocity of the connector, for example to an extent that the advance movement is primarily made possible by the melting (making flowable) of the interlining material, almost without any force being necessary, whereby a crushing of the interlining structure is avoidable.

The penetrable material may include a foaming adhesive, such as a PU adhesive, between the building layers and the interlining, and/or by the interlining that itself may comprise spaces/pores.

In this text the expression "thermoplastic material being capable of being made flowable e.g. by mechanical vibration" or in short "liquefiable thermoplastic material" or "liquefiable material" or "thermoplastic" is used for describing a material comprising at least one thermoplastic component, which material becomes liquid (flowable) when heated, in particular when heated through friction i.e. when arranged at one of a pair of surfaces being in contact with each other and vibrationally moved relative to each other, wherein the frequency of the vibration has the properties discussed hereinbefore. In some situations, for example if the connector has to carry substantial loads, it may be advantageous if the material has an elasticity coefficient of more than 0.5 GPa. In other embodiments, the elasticity coefficient may be below this value.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably comprises a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally comprise a polymeric component that is not cross-linked covalently or cross-linked in a manner that the cross-linking bonds open reversibly upon heating to or above a melting temperature range. The polymer material may further comprise a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the connector is liquefied. This does not exclude the possibility that the non-liquefiable material would be capable of liquefying at temperatures that are not reached during the process, generally far (for example by at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material.

For example, a non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also comprise a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its coupling-out face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side. A broadening of the connector on the proximal side in this text is called "head portion", whereas a broadening at the distal side would be a "foot portion".

In this text, generally the term "underneath" a layer is meant to designate a space distally of this layer if the proximal side being defined to be the side of the layer from which it is accessed during the process. The term "underneath" thus is not meant to refer to the orientation in the earth gravity field during the manufacturing process.

The present invention in addition to the method also concerns a machine that is configured to carry out the method. Such machine comprises a sonotrode with a coupling-out face, a source of mechanical vibration configured to cause the sonotrode to vibrate, and a pressing force mechanism to apply the pressing forces by pushing the sonotrode forward. The machine is configured and programmed to carry out the method as claimed and described in this text, including controlling the pressing force in the manner described and claimed herein.

BRIEF DESCRIPTION OF THE DRAWINGS

In the following, ways to carry out the invention and embodiments are described referring to drawings. The drawings are schematical. In the drawings, same reference numerals refer to same or analogous elements. The drawings show:

FIGS. 24, 25, 26 further connectors;

FIG. 33a an even further connector together with a sonotrode, and FIG. 33b a view of the connector of FIG. 33a;

FIGS. 53 and 54 variants of a sonotrode;

FIG. 55 a further arrangement of a connector and a sonotrode,

FIG. 56 a view of an even further connector;

FIG. 57 a detail of an arrangement with a connector, a first object and a sonotrode during the process;

FIGS. 57a and 57b details of horizontal cross sections through different embodiments of the connector of FIG. 57;

FIGS. 1a-7, 10-12, 16a-19, 20a, 22-25a, 26, 27, 30-32, 33a, 35, and 35, 40, 43, 46-55, 57-63,65, 67-71 all show vertical cross sections or side views, FIGS. 14, 20b, 21, 25b, 39, 40a, 40b, 41 and 42 show horizontal cross sections, FIGS. 64 and 72 show top views, and FIGS. 28, 29, 33b, 36-38, 56 and 66 show views from other angles.

DESCRIPTION OF THE PREFERRED EMBODIMENTS

Figure 1A:
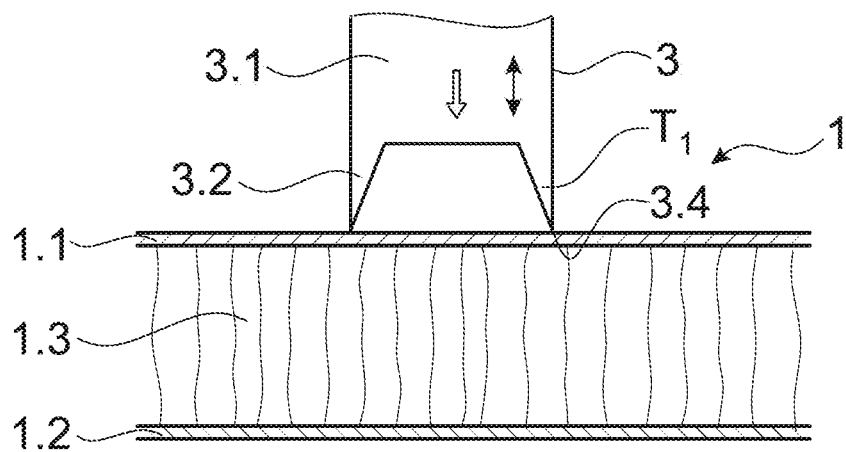
FIGS. 1a-1c a configuration with a first object and a connector during different stages.

The configuration of FIG. 1a comprises a first object 1 being a sandwich board with a first building layer 1.1, a second building layer 1.2, and an interlining 1.3 between the building layers. The first and second building layers may comprise a fiber composite, such as a continuous glass or continuous carbon fiber reinforced resin. The interlining may be any suitable lightweight material, for example a honeycomb structure of cardboard, of a plastic material or of a composite.

An often seen interlining structure is a honeycomb structure with walls forming the honeycomb structure extending approximately perpendicular to the building layer plane between the building layers. For example lightweight building elements of which the interlining layer comprises honeycombs of paper, which is covered by a polymer based material such as by a mixture of polyurethane (PU) and reinforcing fibers.

The interlining may comprise barrier foils and/or web and/or adhesive layers at the interfaces to the building layers. Especially, an additional adhesive may bond the building layers 1.1, 1.2 to the interlining. In an example, a slightly foaming adhesive on polyurethane basis is used. Possible pores in the adhesive may contribute to the anchoring in the various embodiments of the invention. The face that in the depicted orientation is the upper face in this text is denoted as the proximally facing face. The connector 3 is bonded to the first object 1 from the proximal side.

The connector 3 of comprises thermoplastic material at least on a distal end thereof. It may for example consist of the thermoplastic material. The connector in the embodiment of FIG. 1a and other embodiments described hereinafter has a body or head portion 3.1 and a distally protruding tube portion 3.2 that forms a distal punching edge 3.4.

FIG. 1a shows the step of bringing the connector 3 in contact with the first object prior to the onset of the mechanical vibration. The thermoplastic material is than at a first temperature $T_1$ which may for example correspond to room temperature.

Figure 1B:
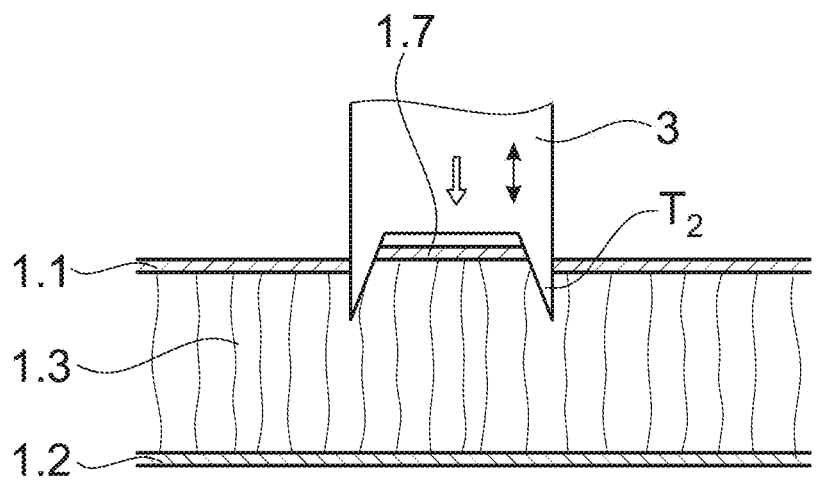

FIG. 1b shows assembly after the step of applying the first pressing force while mechanical vibrations are coupled into the connector 3. A sonotrode 6 with a coupling-out face 6.1 (see FIG. 3) is used to couple the mechanical vibration and a pressing force into the connector 3 to anchor the connector in first object. A counter force to the pressing force is exerted by a support (not shown), for example a non-vibrating support. The effect of the first pressing force, possibly assisted by the mechanical vibration, is that the first building layer 1.1 is punched through. A punched-out portion 1.7 results. FIG. 1b for illustration purposes shows the punched-out portion initially offset towards the proximal direction with respect to the plane defined by the first building layer 1.1; however, in practice any initial displacement, before the step described hereinafter, may depend on stresses or similar within the first object 1.

As a result of the mechanical vibration and the pressing force, the connector 3 at its distal end is at a second, higher temperature $T_2$.

Thereafter, the second pressing force and the mechanical vibration are coupled into the sonotrode. The joint effect of the vibration and the pressing force is that a portion of the thermoplastic material becomes flowable and is pressed into structures of the first object. Thereby, dimensions of the connector change. After the re-solidification, a positive-fit connection results.

Figure 1C:
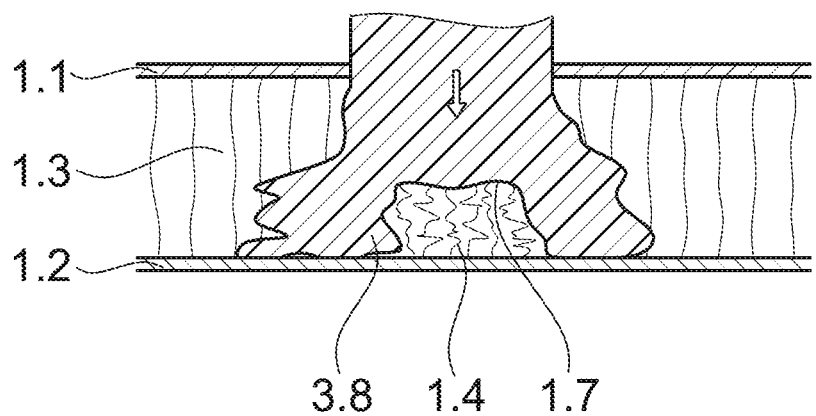

FIG. 1c shows the assembly towards the end of the second-pressing-force-stage. The punched-out portion 1.7 has been displaced towards the distal side, leading to a compressed portion 1.4 of the interlining material. The compressed portion 1.4 of the interlining material, other portions of the interlining material 1.3 around the attachment location as well as, if applicable, possibly a layer of a foaming adhesive, such as a PU adhesive, between the second building layer 1.2 and the interlining layer 1.3 have been penetrated by a flow portion 3.8 of the thermoplastic material. The flow portion has arisen because of external friction between the thermoplastic material and internal friction within the thermoplastic material which have absorbed mechanical vibration energy and heated the flow portion up to a temperature at which it is flowable. After the energy input stops, the flow portion re-solidifies to yield a positive-fit connection between the material of the connector and the interlining layer (if applicable, possibly including the adhesive layer) and optionally also between the material of the connector and the second building layer 1.2.

The punched-out portion 1.7 may essentially remain intact and/or oriented approximately parallel to the plane defined by the building layers 1.1, 1.2. Alternatively, during the process it may become disrupted and/or may attain an undefined orientation. In either case, it may contribute to the mechanical stability of the anchoring of the connector.

Figure 2:
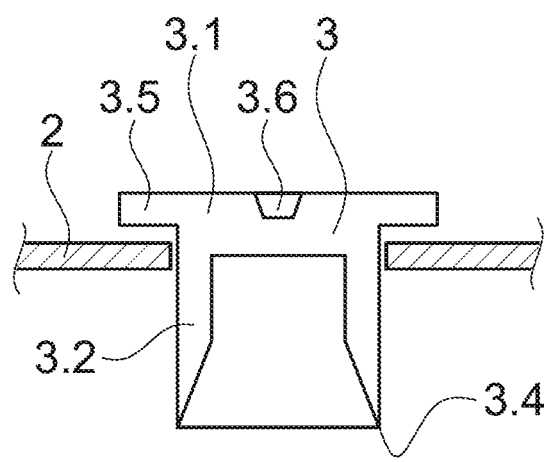
FIG. 2 a connector with a second object.

FIG. 2 illustrates an embodiment of the connector that in addition to what was described referring to FIG. 1a-1c has the following features:

- The body or head portion 3.1 is a head portion defining an outwardly protruding collar 3.5 that defines a distally facing surface portion, whereby a second object 2 with a through opening is clampable between the head portion and the first object to fasten the second object to the first object. Such laterally protruding collar (or other laterally protruding shape) may in addition or as an alternative to serving for fastening a second object also serve as stop feature for the process.
- The proximally facing coupling-in face has a guiding indentation 3.6 cooperating with a corresponding protrusion 6.6 (see FIG. 3) of the sonotrode during the process steps.

These two features are independent of each other, i.e. a connector can be realized having both these features, one of them or none of them.

Figure 4:
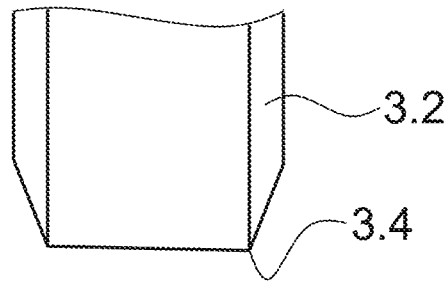
FIGS. 4-7 different distal end portions of a connector.

FIG. 4 shows an alternative distal end of a connector. The punching edge 3.4 is formed by an outwardly tapering section of the tube section 3.2, instead of the inward taper shown in FIG. 1a and FIG. 2.

Figure 5:
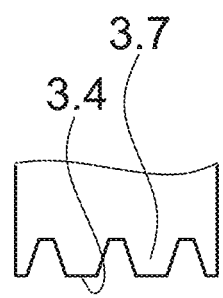

FIG. 5 shows an even further distal end of a connector. In contrast to the previous embodiments, the distal end of the tube section 3.2 does not form a closed contour but is interrupted so that the distal end section 3.7 of the tube section 3.2 comprises a distal crown feature.

Figure 6:
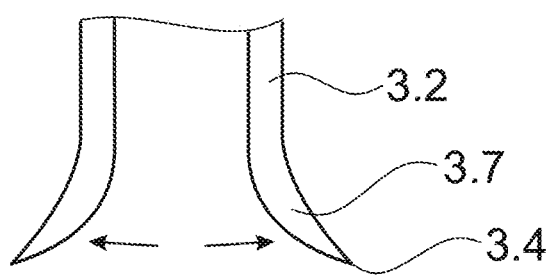

FIG. 6 depicts the option of the distal end section 3.7 being deformed to be bent outwardly (arrows) during the second-pressing-force-stage (and/or during the optional third-pressing-force-stage described hereinafter).

Figure 7:
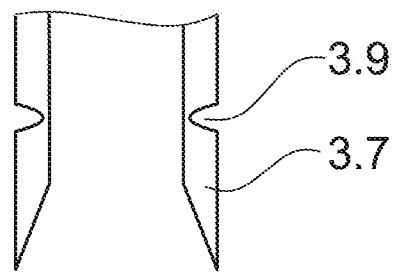

To assist such deformation, the connector may be designed to be collapsible, as illustrated in FIG. 7. To this end, the connector has a circumferential groove 3.9 that constitutes a systematical weakening at a position between the distal end section 3.7 that is to be deformed and the rest of the connector.

Figure 8:
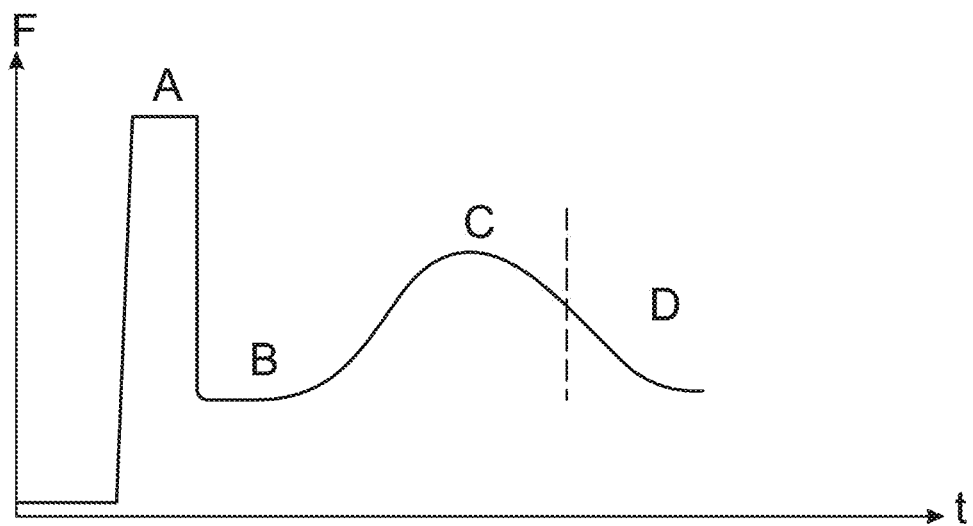
FIGS. 8 and 9 a force vs. time diagram and a force vs. position diagram of an embodiment of a process.

FIG. 8 schematically shows the pressing force applied by the sonotrode as a function of time in a process of the kind described in this text. Initially and during the step of bringing the connector into contact with the first object, the pressing force is zero or almost zero. Then:

- In a first-pressing-force stage A, a high pressing force and optionally also mechanical vibration are applied until the first building layer has been pierced through.
- After this stage A, in a second-pressing-force stage B the pressing force is substantially reduced in order to allow distal portions of the connector to advance slowly through the much softer interlining material so that during the process sufficient vibration energy is absorbed for the liquefaction to set in. During this stage B, the parameters of the mechanical vibration may be different from the parameters that apply during stage A, for example, the amplitude may be smaller than in stage A, because the energy required during stage A is particularly large. It is, however, also possible that the amplitude remains the same, and it is not excluded that the amplitude is increased for stage B, for example if a position-dependent control of the force and amplitude is chosen, to intensify the heating process during stage B.
- Then, in an optional further stage C, the pressing force may again be larger, for example if distal, not yet liquefied portions of the connector reach the second building layer and/or an adhesive layer between the second building layer and the interlining layer. The transition between the second-pressing-force stage B and this third-pressing-force stage C may be continuous, as shown in FIG. 8, or may be stepped. During this further stage C, the mechanical vibration is still coupled into the connector, with an equal amplitude as in stage B or with a different amplitude.
- At a certain point in time, illustrated by the dashed line in FIG. 8, the energy input via mechanical vibration stops. Nevertheless, a pressing force is maintained during a holding pressure stage D. It is possible that during stage D, the pressing force is even increased compared to stage C (in contrast to what is shown in FIG. 8 and FIG. 9), to laterally (radially) push radial displacement of the flow portion or parts thereof.
- Between stage C and Stage D, an optional further stage C' may comprise maintaining the mechanical vibration (with the same or a different amplitude as in stage C) and again increasing the pressing force as soon as all portions of the distal end of the connector have become flowable, because at this stage, there is no risk any more to push through the second building layer, and the additional pressure may enhance the often desirable radial outward (lateral) movement of flowable thermoplastic material into the interlining layer, thereby enhancing the anchoring after the material has re-solidified.

Figure 9:
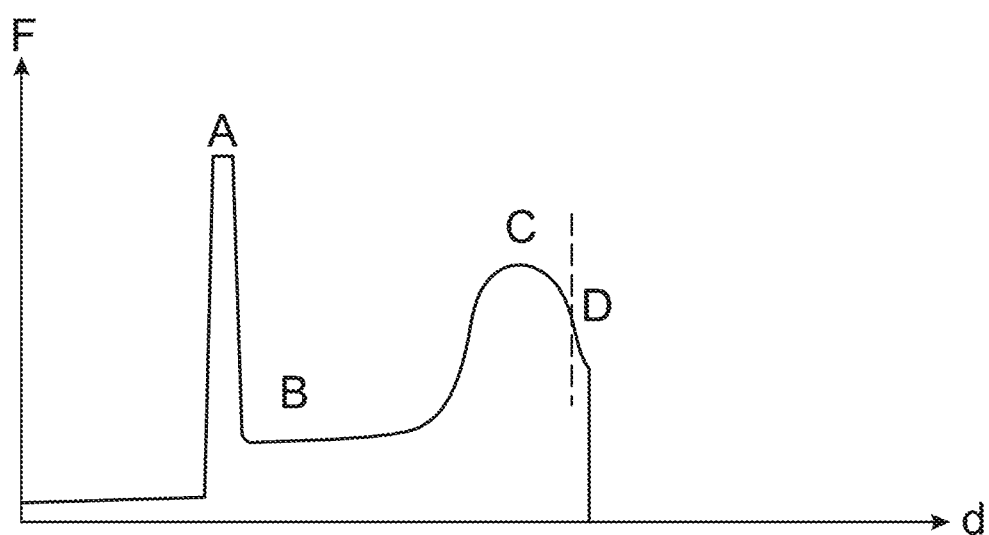

FIG. 9 shows the pressing force in the same process as a function of the position d of the sonotrode with respect to a proximodistal axis. The width of the peak that is representative of phase A corresponds to a combined thickness and limit of elastic-plastic deformation of the first building layer before it is pierced through. The characteristic of FIG. 9 may be used for controlling the pressing force in a sonotrode-position dependent manner.

Figure 10:
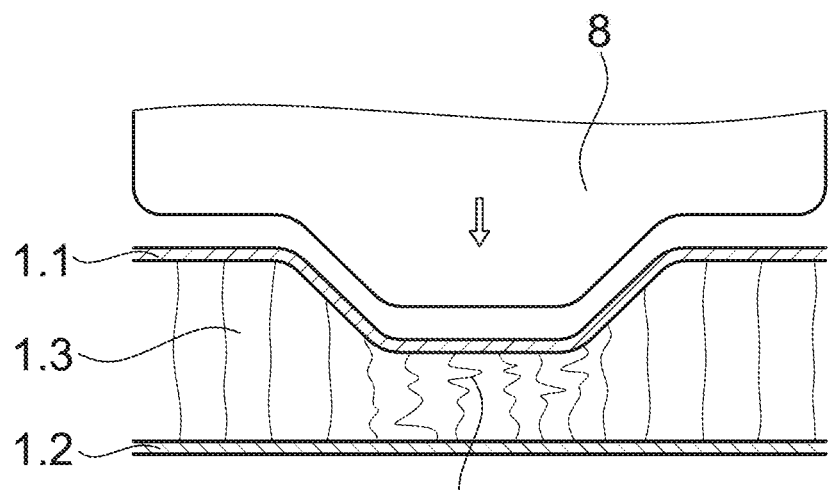
FIG. 10 a process step of adding an indentation by a separate tool.

FIG. 10 illustrates the option of applying a pressing force at least partially by a separate tool 8, prior to the step of bringing the connector into contact with the first object. If the step is carried out with a tool 8 having a relatively shallow protrusion, as shown in FIG. 10, depending on the ductility of the first building layer 1.1 this may lead to a deformation with almost no disruption of the first building layer, or only with disruption at defined locations. Then, the connector may need to pierce or further pierce the first building layer initially, similarly to the above-described embodiments, by applying the first pressing force.

Figure 11:
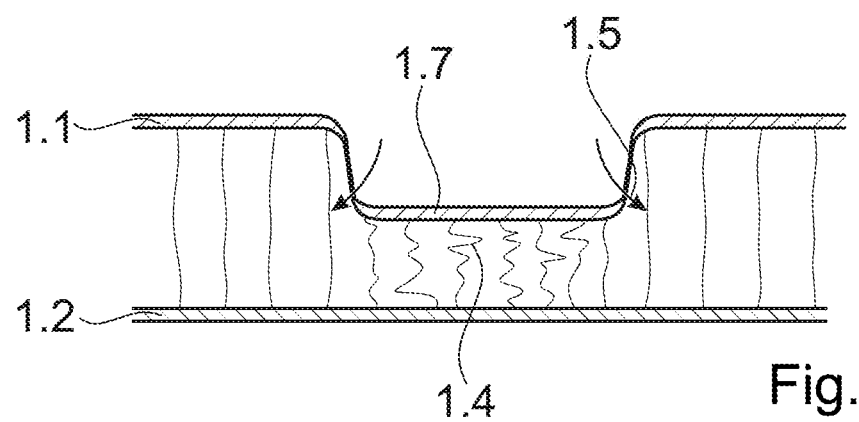
FIG. 11 an alternative indentation, with a disrupted first building layer.

Alternatively, the tool may be such as to punch out the corresponding portion 1.7 of the first building layer, as shown in FIG. 11. Then, it is the tool that applies the first pressing force. The arrows 1.5 illustrate a possible flow path of the flow portion of the thermoplastic material for the subsequent step of applying the second pressing force and the mechanical vibration.

In either case, and in all cases that comprise adding an indentation with side walls, deformed portions of the first building layer 1.1 around the rim of the indentation caused by the tool 8 (or also generated in an other way) may contribute to an additional stability with respect to shear forces (in-plane forces).

Figure 12:
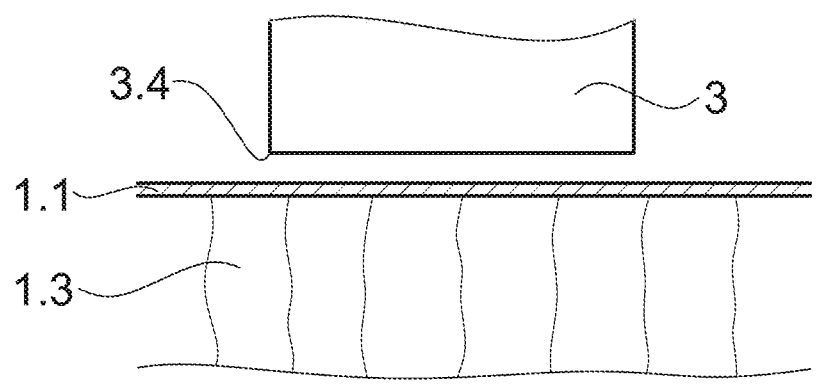
FIG. 12 a configuration with a cylinder shaped connector.

FIG. 12 very schematically shows the principle that the connector 3 does not need to have a tube-shaped section. Rather, the ideal shape may be chosen depending on parameters like first object and first building layer strength, connector material properties etc. Among possible shapes are shapes in which the connector 3 has a flat end as shown in FIG. 12 that shows a connector having the shape of a simple rotational cylinder. A punching edge 14 may be constituted by the edge delimiting the flat distal end.

Figure 13:
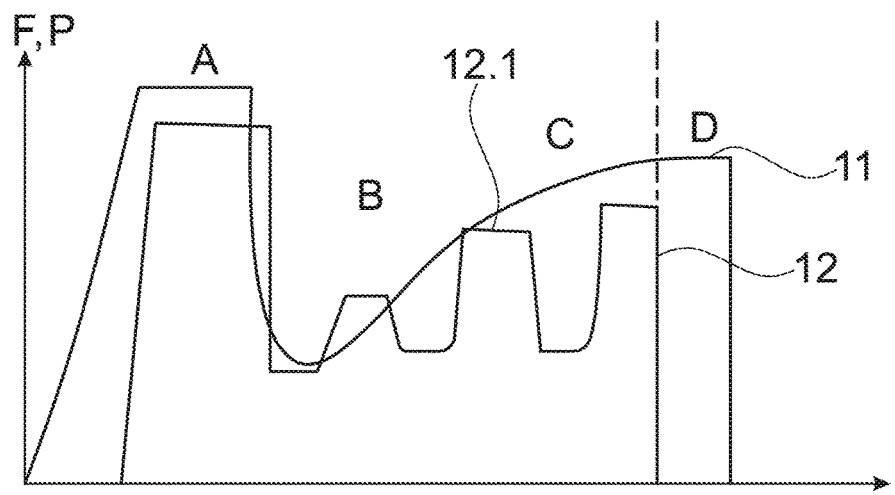
FIG. 13 a process diagram.

FIG. 13 shows a process diagram of a method of anchoring a connector in a lightweight building element. The figure shows the applied force 11 and the vibration power 12 as a function of time. During an initial phase A, a portion of the first outer building layer is punched out. The disruption of the relatively hard first outer building layer demands both, a high force and a high vibration power. In a subsequent phase B, the punched-out portion of the first outer building layer is displaced and more energy is coupled into the connector for making the thermoplastic material flowable. In this phase B, the required force is smaller, and also the vibration power may be smaller than in phase A. When the distal end of the connector—portions of which may already have become flowable and deformed by the forward pressing—is close to the second building layer, the required force raises again (phase C). Also the vibration power may optionally chosen to be higher in phase C than in phase B. As a further option, as illustrated in FIG. 13, during phase B and/or phase C the vibration power may be modulated, for example to comprise a plurality of peaks 12.1 as schematically shown. During an optional last phase (phase D, post-pressing), the vibration power may be switched off but the pressing force is maintained or even raised until the flow portion has at least partially re-solidified.

Modifications of the process are possible. For example, in embodiments after phase A, the vibration may be entirely switched off for some time, for example during advancement of the connector into the first object. In addition or as an alternative, modulation during phase B may comprise switching the vibration source on and off.

Especially if the connector comprises a proximally located collapse zone as mentioned hereinbefore and described in more detail referring to FIGS. 7, 19, 23, 40-43, 49, 50 and others, it may in embodiments be advantageous if prior to phase C the energy input is stopped for some time, for example for 1-5 s, whereby the distal flow portion may be re-solidified, so that when the energy input starts anew the vibration is concentrated in more proximal regions, for example in regions between openings (see for example FIGS. 49a, 50) and thereby initiate the desired collapse.

Figure 14:
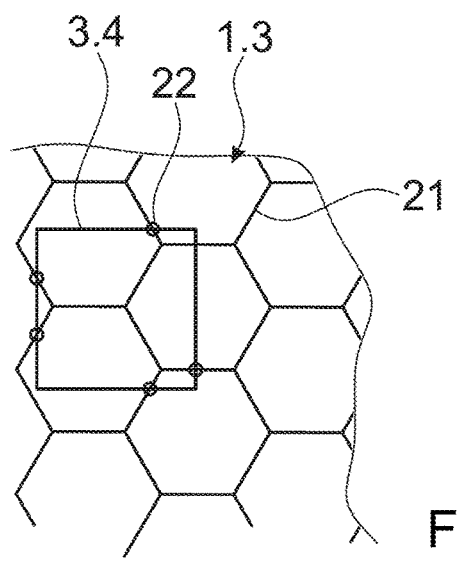
FIG. 14 an interlining layer in horizontal cross section, together with the shape of a possible punching edge.

As schematically shown in FIG. 14, in embodiments the interlining layer has a honeycomb structure or other structure constituted by vertical walls 21 (walls perpendicular to the building layers). In such embodiments, the shape and size of the punching edge 3.4 may be chosen such as to be pressed against the walls at a plurality of spots 22. Thereby, the punching edge cuts through the walls and/or causes the walls to collapse. Collapsed walls may create undercut structures that after interpenetration by the liquefied and re-solidified thermoplastic connector material contribute to the anchoring of the connector.

Especially, the cross section area of the connector at its distal end (for example the area encompassed by the punching edge) may amount to at least about the size of a cell of the structure, so that independent of where the connector is placed relative to the structure, the punching edge will be in contact with the walls at a plurality of spots.

Figure 15:
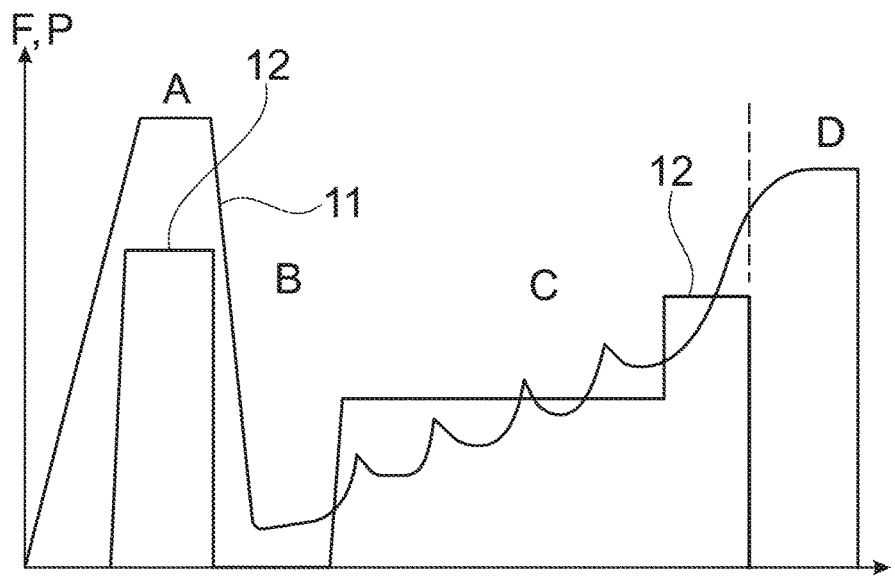
FIG. 15 a variant of a process diagram.

FIG. 15 shows a variant of the process diagram of FIG. 13. In this variant, three independent differences to the embodiment of FIG. 13 are illustrated:

The vibration is switched off during an advancement phase (phase B or at least the beginning of phase B) after the first building layer has been pierced.

The vibration power 12 is increased towards the end of phase B.

The force 11 has a plurality of peaks as a function of time, resulting from the distal end meeting discrete structures of the interlining layer.

Figure 16A:
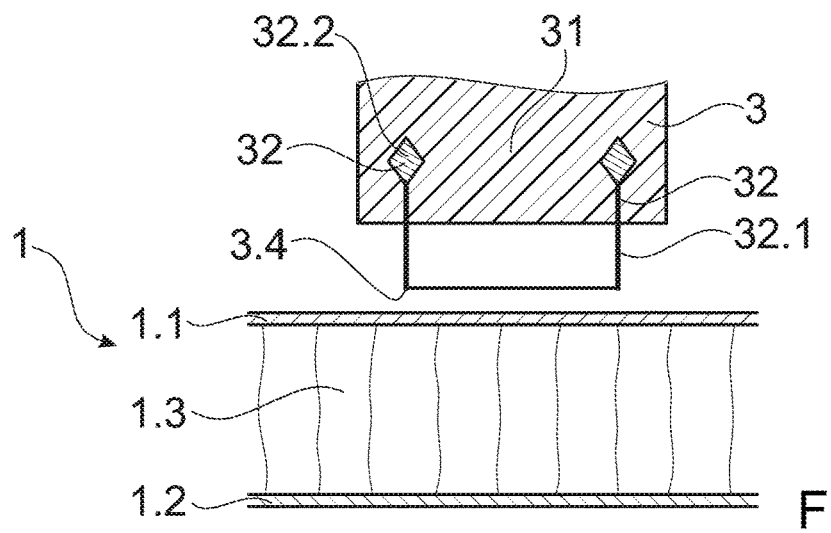
FIGS. 16a and 16b, again in vertical cross section, an arrangement with a connector and a first object during different stages of the process.

FIG. 16a shows an embodiment of a connector that is configured to punch through the first building layer 1.1 but is configured so that the second building layer 1.2 is protected even if the vertical position (z position) of the distal end cannot be precisely controlled.

To this end, the connector 3 has in addition to a body 31 of the thermoplastic material also a non-liquefiable part 32. The non-liquefiable part 32 may for example be metallic. The non-liquefiable part has a tube portion 32.1 that protrudes from the body 31 on the distal side and forms the distal punching edge 3.4. In addition it has an anchor portion 32.2 running in an interior of the body 31. The shape of the anchor portion 32.2 is such that when pressed towards proximally it will tend to advance towards proximally relative to the body as soon as the body material is deformable. However, the anchor portion will be so that the energy concentration effect and hence the initial energy density at the distal punching edge 3.4 is higher than at the proximal end of the anchor portion 32.2, especially if the first building layer is comparably strong and requires a high energy to be punched through and/or if the material of the body 31 is comparably soft.

The shape and thereby the energy concentrating properties of the anchor portion 32.2 in this may be tailor-made and designed in accordance with its purpose. For example, for certain embodiments it may be advantageous if the thermoplastic material of the body 31 is a comparably soft, low melting material such as polypropylene (PP), for example if towards the end of the process a weld to material of the first object is desired, which material may also be PP. In such embodiments and/or if the first building layer is comparably strong, the anchor portion may have a comparably blunt proximal structure that has a limited energy concentrating effect, whereas for more solid body material and weaker first object material, the energy concentrating properties of the anchor portion may be chosen to be more pronounced.

In an initial phase, the material of the body 31 will be solid, and when the pressing force and the vibration are coupled into the connector, the pressing force and vibration energy will impinge on the interface between the punching edge 3.4 and the first building layer 1.1, whereby the first building layer is punched. This process will also cause energy to be absorbed by the non-liquefiable part 32 and at the interface between the body 31 and the part. Therefore, when the connector is pressed further into the sandwich board 1, in addition to the flow portion 3.8 an internal flow portion 3.10 around the non-liquefiable part 32 is formed, whereby the non-liquefiable part is pushed back towards proximally relative to the body 31 when the connector is pressed forward towards distally. This is shown in FIG. 16b.

The length of the portion (tube portion in FIG. 16*a*/16*b*) and the geometry of the anchored portion may therein be such that the non-liquefiable part is fully retracted into the body when the distal end of the connector reaches the second building layer 1.2, so that when this is the case the connector cannot punch any more.

Figure 16B:
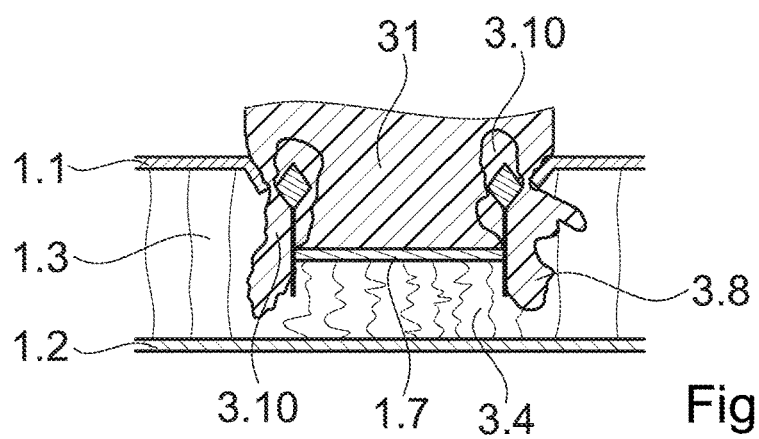
Figure 16C:
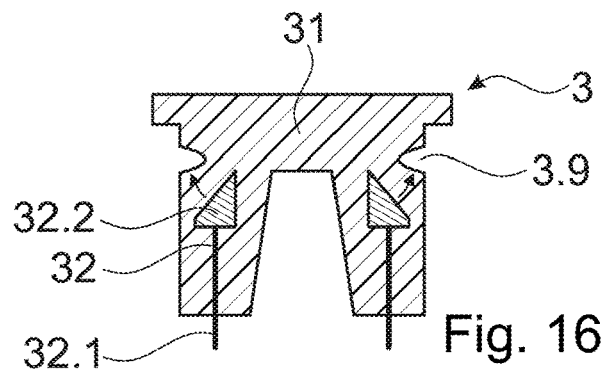
FIG. 16c an arrangement of a connector with a not-liquefiable portion.

FIG. 16*c* shows a variant that differs from the embodiment of FIG. 16*b* by the following features:

- The liquefiable part instead of being a block of liquefiable material has a tube portion and a circumferential groove 3.9, whereby it is collapsible similarly to the embodiment of FIG. 7.
- The anchor portion si shaped to have an expanding effect, i.e. it is shaped to exert an outwardly directed pressure on liquefied or not yet liquefied thermoplastic material when being pushed towards proximally relative to the liquefiable part. This is illustrated by the arrows in FIG. 16*c*.

Both these features—that can be realized independently of each other, assist the creation of a proximal liquefaction zone, i.e. the flow portion of the thermoplastic material will comprise a portion that is located proximally, for example immediately distally of the first outer building layer and will cause that the corresponding portion of the flow portion will be displaced towards radially outward, whereby the anchoring, especially also immediately distally to the first outer building layer, is stronger—for example by a rivet effect.

Figure 17:
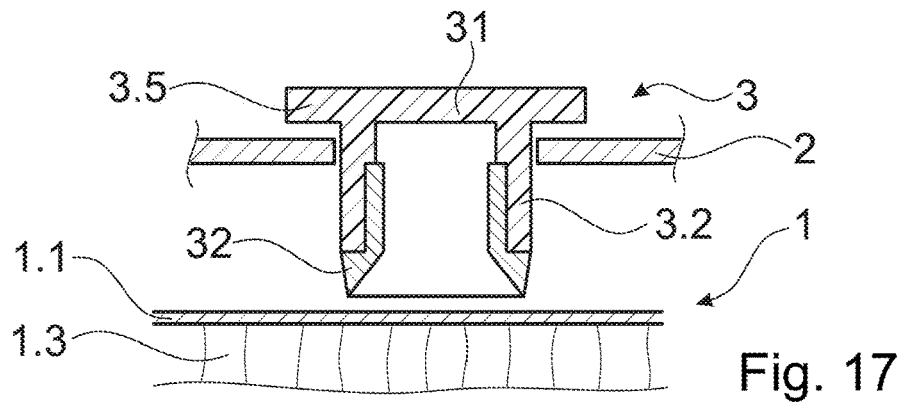
FIG. 17 an arrangement of a connector with a not-liquefiable portion, a second object and a first object.

FIG. 17 depicts a variant of this concept where the non-liquefiable part is a shoe of the tube portion 3.2.

FIG. 17 also shows the principle of the connector having a collar 3.5 that is shaped to be suitable for securing a second object 2, for example a metal sheet or the like, to the first object 1. More details concerning possibilities of this concept are described hereinafter referring to FIGS. 27 and 67-72.

Figure 18A:
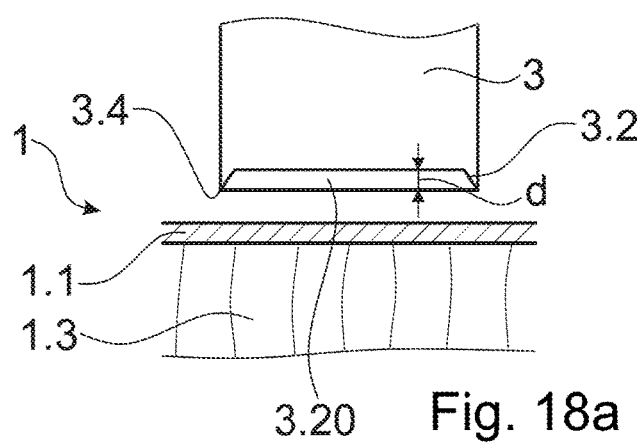
FIGS. 18a and 18b an even further embodiment during two different stages.
Figure 18B:
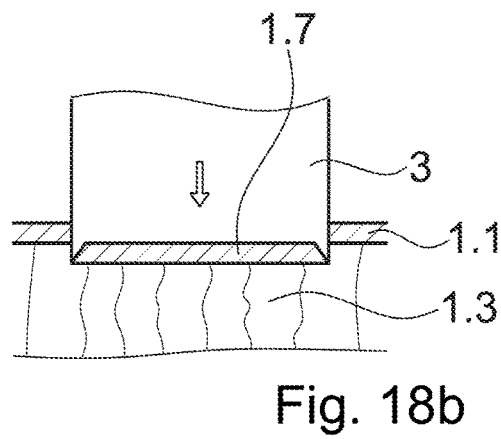

An other alternative of a measure protecting the second building layer from being pierced is illustrated in FIGS. 18*a* and 18*b*. The tube portion 3.2 of the connector is very short only, so that a depth d of the volume encompassed by the tube portion 3.2 is equal to or smaller than a thickness of the first building layer. Thereby, the punched-out portion 1.7 fills the volume and thereby protects the punching edge 3.4, i.e. protects the parts against which the connector is pressed from the punching edge (FIG. 18*b*).

Figure 19:
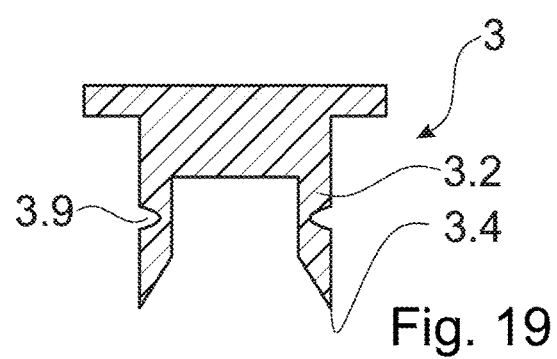
FIGS. 19, 20a, 20b, and 21 embodiments of a collapsible connector.

An even further possibility is to make the distal end of a thermoplastic connector 3, which distal end carries the punching edge 3.4, collapsible. FIG. 19 illustrates a connector with a tube portion that has a circumferential groove 3.9 where the connector will collapse as soon as the thermoplastic material next to the groove 3.9 is sufficiently deformable after the first heat input.

Figure 20A:
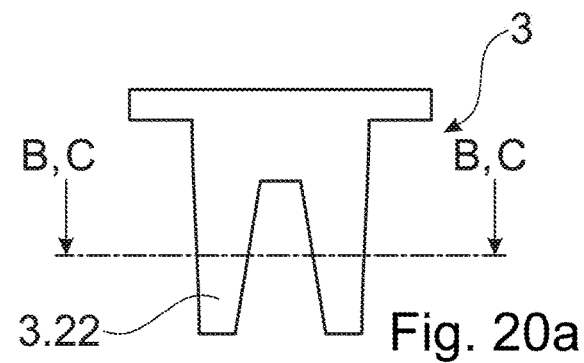
Figure 20B:
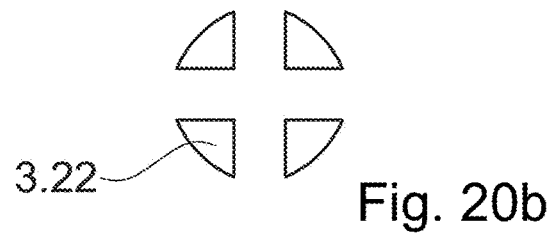
Figure 21:
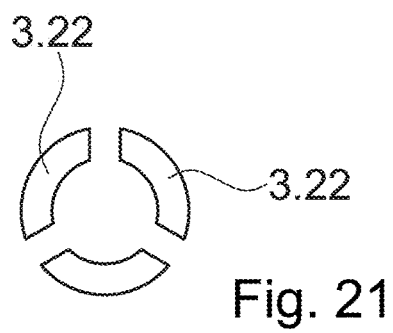
Figure 22:
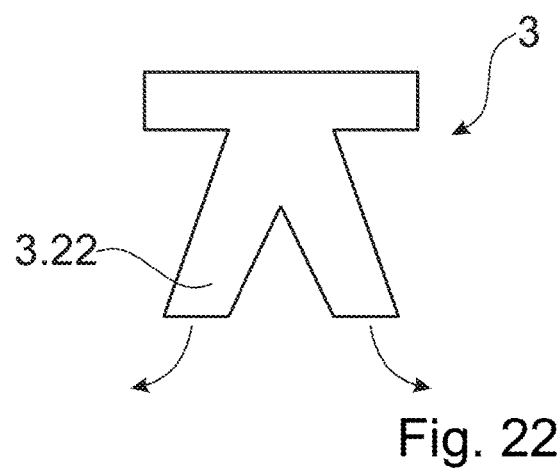
FIGS. 22 and 23 two further embodiments of connectors

FIG. 20*a* schematically illustrates the possible concept of the connector having outwardly deformable legs 3.22 that after an initial softening following penetration of the first building layer become capable of being deformed, especially outwardly. FIG. 20*b* shows a horizontal cross section through the distal portion of the connector having the leg portion (along the plane B,C-B,C in FIG. 20*a*). FIG. 21 shows a possible alternative cross section through the distal portion of the connector having the deformable legs 3.22. FIG. 22 depicts the principle referring to a connector with two leg portions 3.22, wherein the arrows show the direction of deformation after the initial softening.

Figure 23:
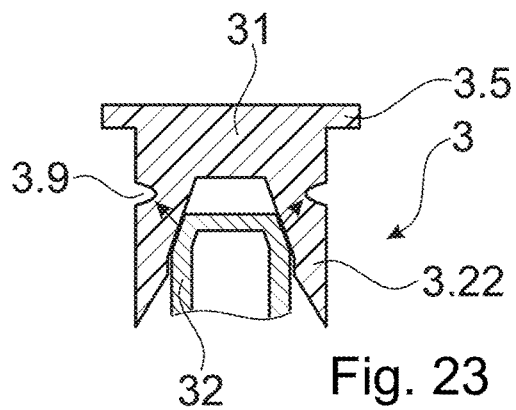

FIG. 23 shows an example that involves a combination of the principles of a non-liquefiable part 32 being pressed towards proximally relative to the liquefiable part 31 during the process and of spreading legs 3.22 in that the legs belong to the connector body 31 and are spread by the retracting movement of the non-liquefiable part 32. The non-liquefiable part to this end tapers towards proximally, as illustrated in FIG. 23, or has an other ramp-like feature that is capable of exerting an outwardly directed force on liquefied or not yet liquefied thermoplastic material.

In the embodiment of FIG. 23, the non-liquefiable part 32 is not piercing, i.e. it has a distally facing structure that does not cut into the material of the first building layer.

In addition or as an alternative to causing the legs to be spread, such non-liquefiable part displacing liquefiable material towards radially outward may have an other effect and purpose. Namely, optionally in combination with a collapse structure (FIG. 23 illustrates a circumferential groove 3.9 to this effect), the non-liquefiable part 32 assists in causing thermoplastic material of the liquefiable part 31 to be liquefied not only at the distal end but also more proximally, for example immediately distally of the first outer building layer 1.1. In addition or as an alternative to assisting liquefaction, the non-liquefiable part may cause an outward displacement force on liquefied thermoplastic material of the liquefiable part 31 so that the corresponding portion of the flow portion will be displaced towards radially outward, whereby the anchoring, especially also relative to the first outer building layer, is stronger.

Figure 24:
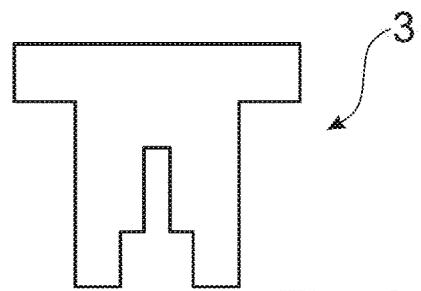

FIG. 24 shows a variant of the embodiments of FIGS. 20*a*-22, wherein the connector has a step-wise reduced cross section.

Figure 25A:
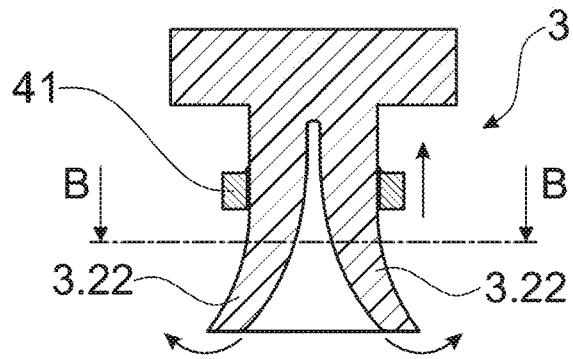
Figure 25B:
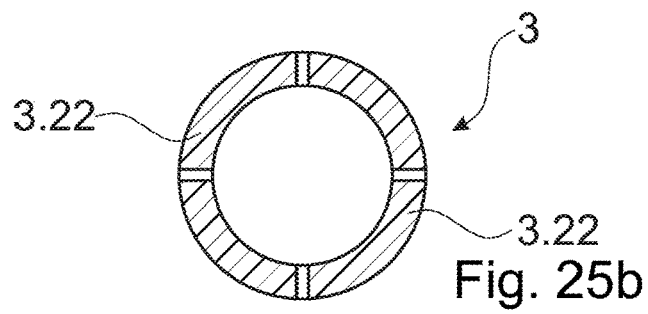

FIGS. 25*a* and 25*b* depict an example of an embodiment in which the legs are relatively flexible from the beginning and in which a stabilizing element 41, such as a ring of a non-liquefiable material. The ring (or other stabilizing element) will initially be located close to the distal end of the connector and will be shifted backward (arrow) by the introduction of the connector into the first object, especially by abutting against the proximally facing surface of the first building layer.

Figure 26:
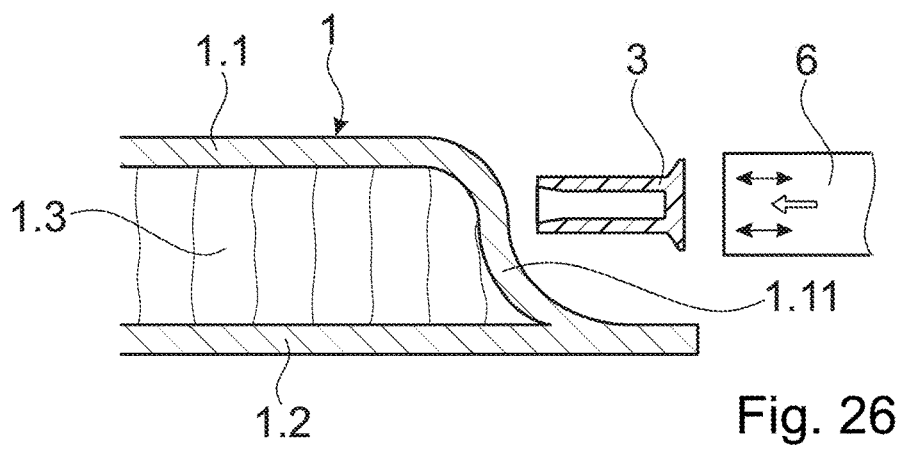

FIG. 26 illustrates the possibility that the connector can be anchored in a lightweight building element from sideways, i.e. from laterally. Especially, a lightweight building element may along its edge be formed to be finished by one of the outer building layers being bent towards the vertical and towards other outer building layer and may be connected therewith, as illustrated in FIG. 26. Thereby, the bent outer building layer (the first outer building layer 1.1 in the example illustrated in FIG. 26) has an edge finishing section 1.11, and the connector 3 may be pressed into the lightweight building element by being brought into contact with the finishing section 1.11, and by a substantially horizontal pressing force, as illustrated in FIG. 26. Embodiments of this kind need the interlining layer 1.3 to be sufficiently stable to exert a counter force to the second pressing force which counter force is sufficient for thermoplastic material of the connector to become flowable by the effect of the energy input. If the counter force by the interlining layer 1.3 is not as such sufficient to make a solid anchoring by the described method possible, additional measures may be taken, such as shaping the connector as described referring to FIGS. 16-25 or providing it with other collapsible structures, for example of the kind described hereinbelow.

Figure 27:
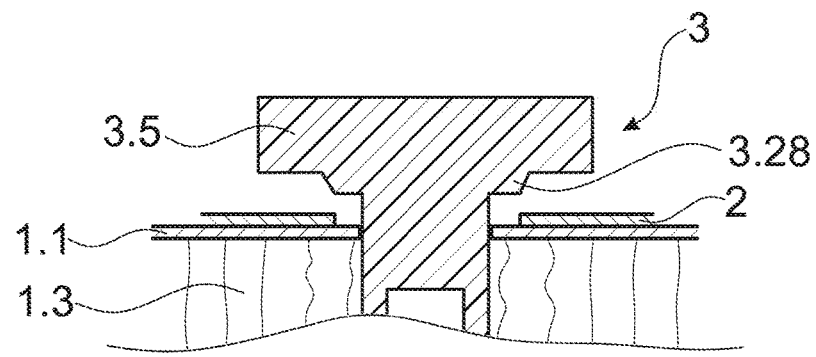
FIG. 27 a connector with a plug portion with a second object and a first object.

Yet another principle is described referring to FIG. 27. The connector 3 has a plug portion 3.28 distally of the collar 3.5, which plug portion is dimensioned to have a slightly larger cross section (at least with respect to one in-plane dimension) than the opening in the second object 2 to be secured to the first object 1. The cross section of the plug portion is, however, is substantially larger than a cross section of the shaft and/or tube portion distally thereof, which shaft and/or tube portion penetrates into the first object during the process. The plug portion towards the end of the process is pressed into the opening, wherein the mechanical vibration energy and pressing force cause a tight connection between the plug portion and the second object.

The plug portion 3.28 may be circumferential and continuously compact. Alternatively, it may be structured, for example by comprising a plurality of radially running ribs that in addition to serving as the plug portion may have energy directing properties. This may be of special interest in case the building layer is not homogenously dense but for example consists of a consolidated fleece/PP/glass fiber composition.

The tight connection between the plug portion and the second object and/or an according tight connection between the plug portion and the first building layer may comprise one or more of: a press fit, a polymer-polymer weld connection, an interpenetration of material of the second object/first building layer by molten and re-solidified material of the plug portion.

In FIG. 27, the connector 3 is depicted to consist of the thermoplastic material.

In either case, the connection between the plug portion and the second object 2 may cause a seal between proximally of the second object and distally of the second object.

For many applications, the connector needs to be relatively precisely positioned relative to the first object when it is anchored in the first object. FIGS. 28-31 illustrate a first possibility to do so.

Figure 28:
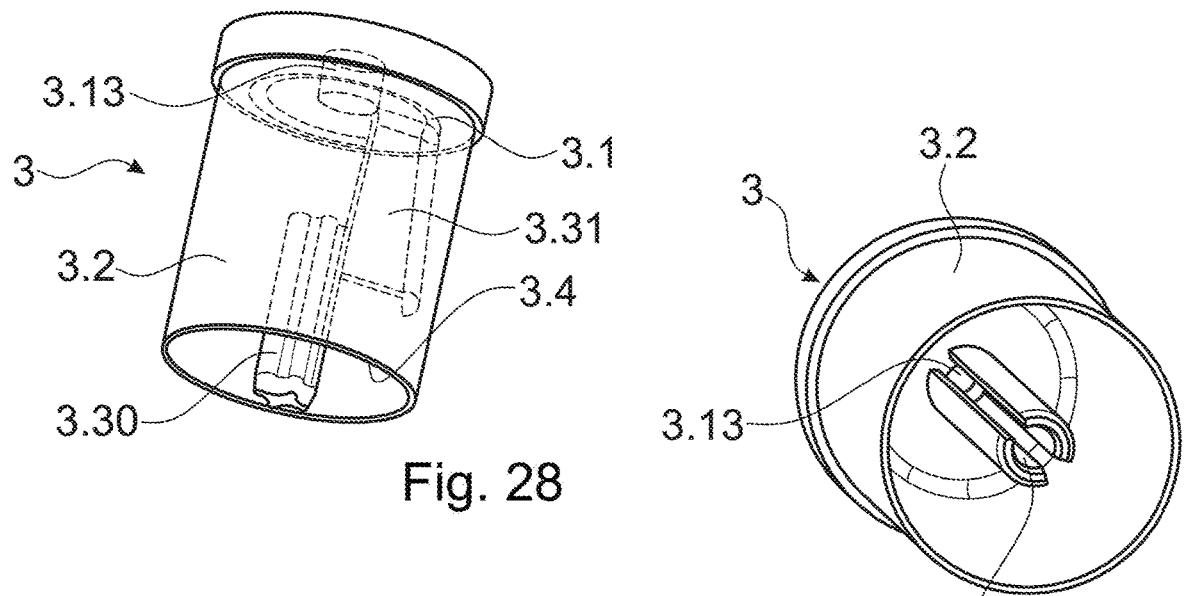
FIGS. 28, 29, 30 embodiments of connectors with guiding portions.
Figure 29:
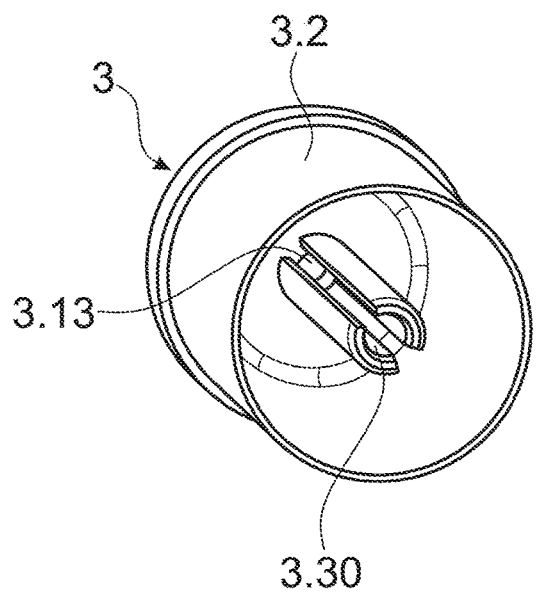
Figure 30:
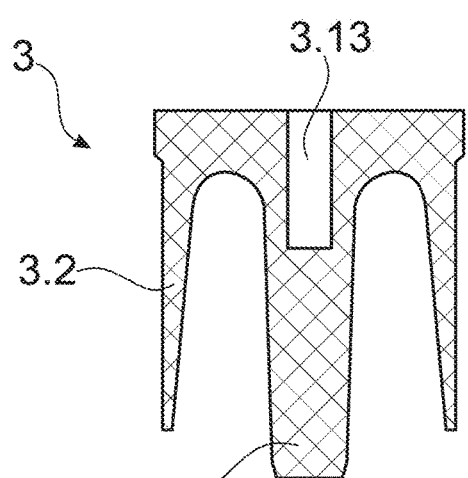

The connectors 3 shown in FIGS. 28, 29 and 30, in addition to a tube portion 3.2 the distal edge of which forms a punching edge 3.4, comprises a for example central guiding portion 3.30. The guiding portion 3.30 protrudes distally further than the plane defined by the punching edge 3.4. Thereby, the guiding portion may be introduced in a guiding hole 1.10 in the first building layer 1.1 when the connector is positioned relative to the first object to bring the distally facing surface portion (punching edge) into contact with the first building layer and before the pressing force sets in (and in most embodiments also before the mechanical vibration sets in), as for example shown in FIG. 31. The guiding hole 1.10 in the first object may be pre-manufactured and positioned with the desired precision using conventional means such as by drilling or punching.

Figure 31:
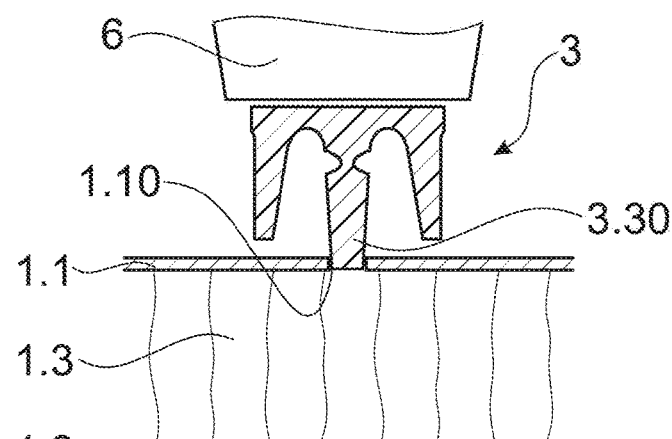
FIG. 31 an arrangement with a connector having a guiding portion.

Because the guiding hole 1.10 and the guiding portion 3.30 together define the position of the connector relative to the first object, the sonotrode 6 does not need to be precisely positioned and does not need to have a shape precisely adapted to the shape of the connector 3, as also illustrated in FIG. 31.

The guiding portion 3.30 during the process may be at least partially made flowable and caused to interpenetrate structures of the interlining layer and/or may be caused to collapse and/or deform. To this end, the guiding portion 3.30 may be thermoplastic. In addition or as an alternative, the guiding portion may be mounted in a manner that it is connected to the remaining portions of the connector only relatively weakly, so that the connection can be broken/loosened by the energy input during the process. For example in the embodiment of FIG. 28, the guiding portion 3.30 is connected to a mount portion 3.31 in a manner that it is not directly supported by the body 3.1 of the connector with respect to axial forces, so that a sufficient axial force may shear the guiding portion 3.30 off. In the embodiment of FIG. 29, the guiding portion 3.30 is slit so that it comprises two legs that can be deformed to spread apart. In the embodiment of FIG. 30, also a slit configuration may be chosen (not visible in FIG. 30) and/or a fastening hole 3.13 extending into the guiding portion 3.30 causes a local weak point towards the proximal end of the guiding portion.

In embodiments, the guiding portion and the corresponding guiding hole may be configured to have a not rotationally symmetrical cross section so that not only the position is defined but also a discrete number of possible orientations. FIG. 28 shows an example of a guiding portion that is symmetric with respect to rotations around the proximodistal axis.

FIGS. 28-30 show a further optional feature of connectors according to the present invention. Namely, the connectors each have a fastening hole 3.13 extending from the proximal end inwardly. The fastening hole 3.13 may be a through hole (FIGS. 28 and 29) or a blind hole (FIG. 30), depending on the construction. A fastening hole 3.13 may serve for a screw or other fastener (including fastening portions of a further object to be connected to the first object) to be inserted therein, whereby the connector may serve as anchor for a further object connected to the first object. This may optionally be combined with the collar discussed hereinbefore that may serve for securing a second object to the first object. The fastening hole 3.13 may optionally comprise a thread or other fastening structure.

Figure 3:
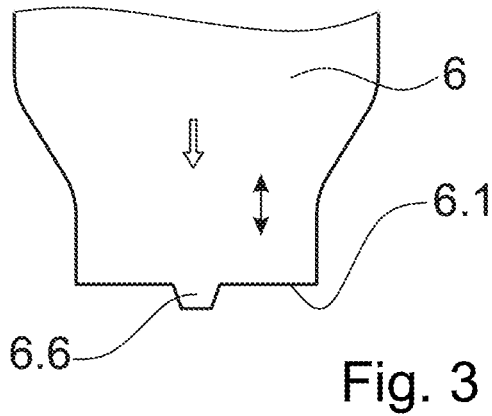
FIG. 3 a sonotrode.
Figure 32:
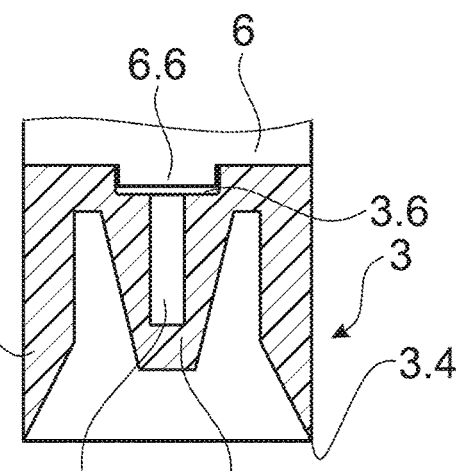
FIG. 32 a further connector.

A second option for positioning the connector precisely relative to the first object comprises positioning the sonotrode (or a separate guiding tool) precisely relative to the first object and guiding the connector by the sonotrode (or the separate guiding tool, respectively) during the process. The principle of guiding the connector by the sonotrode by means of a guiding protrusion 6.6 cooperating with a guiding indentation 3.6 of the connector is shown in FIGS. 2 and 3. FIG. 32 illustrates a further example of a connector 3 with a guiding indentation 3.6 and a sonotrode 6 with a corresponding guiding protrusion 6.6. The guiding indentation 3.6 in the embodiment of FIG. 32 is in addition to a fastening hole 3.13 and proximally thereof. It would alternatively also be possible to use the fastening hole as guiding indentation.

The embodiment of FIG. 32, independent of the principle of the receiving indentation, has an other special feature: The connector 3 has a head or body portion 3.1 with the guiding indentation 3.6 and a distally protruding tube portion 3.2 that forms the distal punching edge 3.4. In contrast for example to the embodiment of FIG. 2, the connector further comprises a fastener receiving portion 3.12 that is formed as a central distal protrusion extending distally from the head or body portion 3.1. In the fastener receiving portion 3.12, there is a fastening hole 3.13. The fastening hole may serve for inserting a fastener, such as a screw or a pin. Depending on the properties of the fastener to be used and on material properties of the connector, the fastening hole may comprise an according structure, for example an inner thread.

Instead of a fastening hole, or in addition thereto, the connector may have an other fastening structure, for example a make fastening structure instead of a female fastening structure (for example a threaded bar or similar). An according sonotrode used may have an according indentation that receives such fastening structure and thereby avoids the direct coupling of vibration into the fastening structure.

Figure 33A:
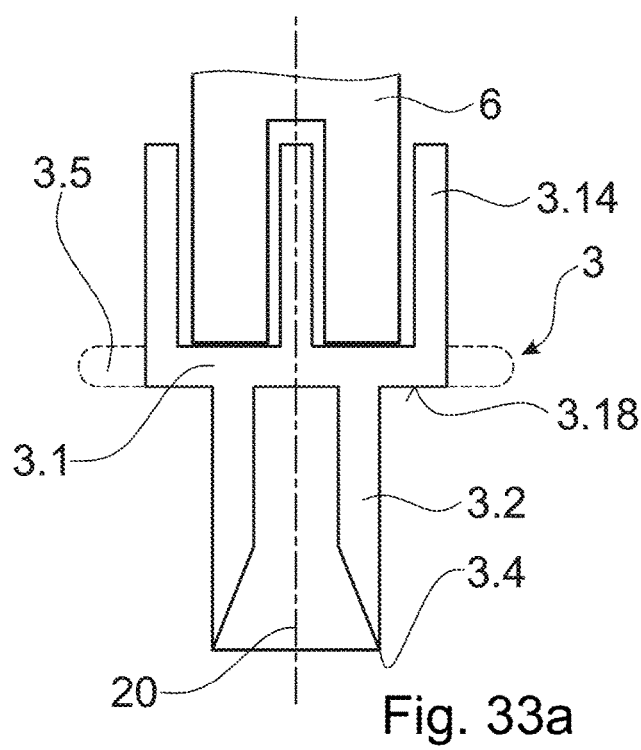
Figure 33B:
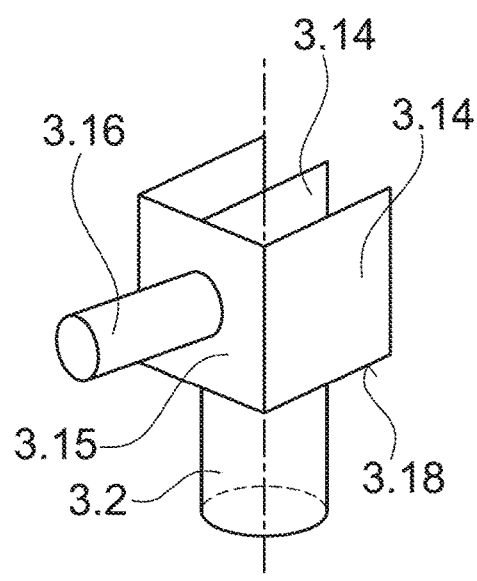

The connector 3 shown in FIGS. 33*a* and 33*b* is an example of a connector that in addition to an anchoring structure (which comprises the thermoplastic material that during the process is made flowable and, if applicable, the punching structure) also comprises a connecting structure defining a connecting location, especially a connecting location defined with respect to all dimensions (x,y,z). The connecting structure in the depicted embodiment is constituted by a connector peg 3.16 one-piece with the anchoring structure.

The connecting structure—the connecting peg 3.16 in the shown embodiment—is especially such that it is arranged laterally. This means that the arrangement of the connecting structure 3.16 is not symmetrical with respect to the insertion axis 20 but is off-center with respect to the axis 20. The insertion axis 20 is the axis along which generally the pressing force is applied during insertion and along which the movement during insertion will take place at least predominantly. The insertion axis 20 is generally central with respect to the punched-out portion. Thus, the axis is especially defined by the tube portion of the connector or other structure defining a punching or break-out contour and/or piercing spot.

Thereby, the position of the connecting location depends on the angle of rotation around the axis 20. Hence, in contrast to most of the embodiments discussed hereinbefore, when the connector relative is positioned relative to the first object and anchored therein, not only the position but also its orientation may have to be defined.

An example of an according connecting structure may for example be a structure (like the peg) that protrudes away from the anchoring structure into a defined direction, such as a pivot of a hinge or similar, a structure for clipping an other item onto, an anchor for a thread connection, etc.

The connector 3 of FIGS. 33a and 33b comprises a plate-like body portion 3.1 defining a distally facing abutment face 3.18. From the abutment face 3.18, a tube portion 3.2 having the distal punching edge 3.4 protrudes towards distally. Towards proximally, the connector comprises a base wall 3.15 from which the connecting peg 3.16 protrudes laterally. The base wall is arranged off-center with respect to the axis 20. Further, the connector comprises a plurality of reinforcing walls 3.14 extending perpendicularly to the base wall 3.15 and enhancing the mechanical stability with respect to forces acting on the connecting peg.

The distally facing abutment face defines the z position of the connecting structure after the process in that the pressing force is applied until the abutment face 3.18 abuts against a proximally facing surface portion of the object.

The connector 3 in the embodiment of FIGS. 33a and 33b as well as the connectors of the embodiments of FIGS. 34 and 35 hereinafter may for example be a mount of a rear parcel shelf of an automobile.

The sonotrode 6 used for anchoring the connector may be shaped to be adapted to the shape of the connector. Especially, as shown in FIG. 33a, the connector may be shaped to impinge, from proximally, on the body portion 3.1 by engaging between the reinforcing walls 3.14 and the base wall 3.15. In addition or as an alternative, it would also be possible to provide a protruding collar 3.5 of the connector 3, as shown in dotted lines in FIG. 33a. The arrangement with the sonotrode engaging between the walls directly on the body portion 3.1, with the sonotrode having indentations for reinforcing wall(s) if necessary, though, features the advantage that the pressing force and vibration are coupled straight into the anchoring portion.

In embodiments that comprise a connecting location the position and/or orientation of which depends on the orientation of the connector around its axis 20, it may be necessary to guide the orientation of the connector during the anchoring process, because due to the vibration input the connector may be subject to some uncontrolled twisting movements during insertion. In the embodiment of FIGS. 33a and 33b, the base wall 3.15 and/or the reinforcing walls 3.14 may be used for this, together with a corresponding shape of the sonotrode, whereby the orientation of the sonotrode defines the orientation of the connector.

Figure 34:
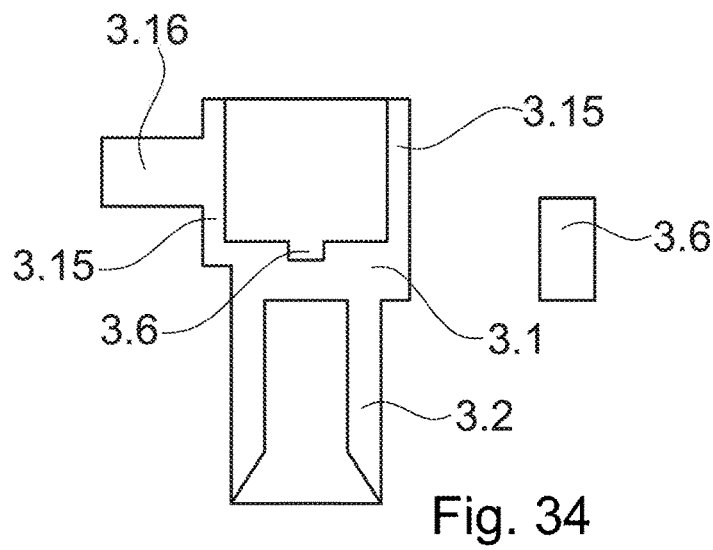
FIGS. 34-38 other embodiments of a connector.

In addition or as an alternative, as sketched in FIG. 34 (where the right panel depicts an enlarged top view on the guiding indentation 3.6), the connector and the sonotrode may comprise according guiding structures that are not circularly symmetrical, such as a rectangular guiding protrusion of the sonotrode engaging with a corresponding guiding indentation 3.6 of the connector. Other shapes of guiding protrusion and guiding indentation are possible, including any shapes known for screw heads, including hexagonal, star-shaped, etc.

The embodiment of FIG. 34 comprises an annular base wall 3.15 from which the connecting peg 3.16 protrudes outwardly, the base wall following a for example circular or rectangular contour and thereby defining a pot-like structure with the connector body defining the bottom of the pot, wherein the sonotrode during the process is pressed against this bottom.

Figure 35:
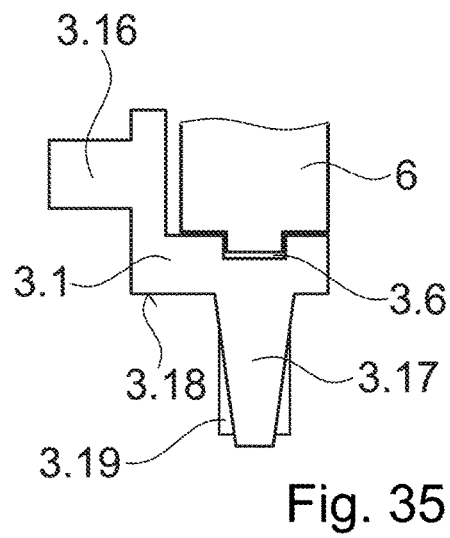

As schematically sketched in FIG. 35, embodiments implementing the aspect of a connecting structure or other off-center functional structure in addition to the anchoring structure are not restricted to embodiments that implement the first aspect, which first aspect comprises displacing a portion of the first outer building layer (that may remain contiguous) at the attachment location with respect to the interlining layer by applying a first pressing force and/or the second aspect. FIG. 35 shows a connector that is has a proximal portion similar to the corresponding structure of the embodiment of FIG. 34, but with a base wall that is not annular.

Independent thereof, the anchoring structure comprises an anchoring structure pin portion 3.17 that is for example pressed through the first building layer and into the interlining layer for anchoring.

The pin portion 3.17 in the embodiment of FIG. 35 has a plurality of axially running energy directors, namely wings 3.19 protruding radially.

Figure 66:
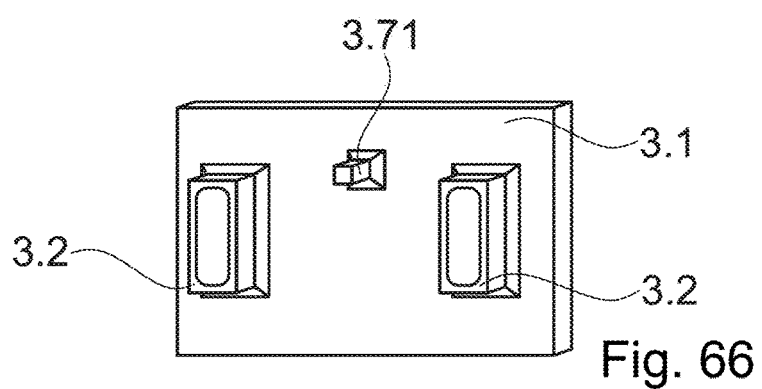
FIG. 66 a bottom view (view from the distal side) of yet another connector.

The embodiments of FIGS. 33-35 comprise using a sonotrode adapted to the geometry of the connector. This is not always necessary. FIG. 66 shows an embodiment in which the body portion 3.1 forms a generally flat coupling surface for a generic sonotrode.

The embodiment of FIG. 66 has additional features that can be realized independently or in combination with each other and/or with other features illustrated in FIG. 66:

- The connector 3 has a plurality of cutting elements, namely two cutting elements. Each of these cutting elements is constituted by a tube portion 3.2 with a distal punching edge.
- The tube portions(s) is/are not circular but have an approximately rectangular outer contour. Generally, any cross section leaving a hollow space inside a surrounding wall may be used.
- The distal punching edge is not sharp but blunt.
- The connector in addition to the cutting element(s) has a process controlling abutment protrusion 3.71. In FIG. 66, this abutment protrusion together with the cutting elements forms a tripod whereby when the connector is brought into contact with the first building layer, the connector position is well-defined and stable.
- An abutment protrusion 3.71 of this kind may, during the subsequent process, collapse or melt away. It does not necessarily have to pierce the first building layer, i.e. it does not need to have any piercing property.

In addition to stabilizing the connector during an initial stage of the process, it also dampens undesired bending vibrations when the connector body 3.1 has a substantial lateral extension.

Figure 36:
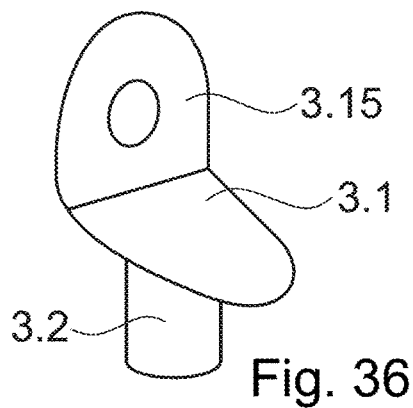

FIG. 36 shows a connector that is based on the principle described referring to FIGS. 33*a*-35. In contrast to the embodiments of these figures, the connecting structure is not a peg but a fastening hole in the base wall 3.15.

Figure 37:
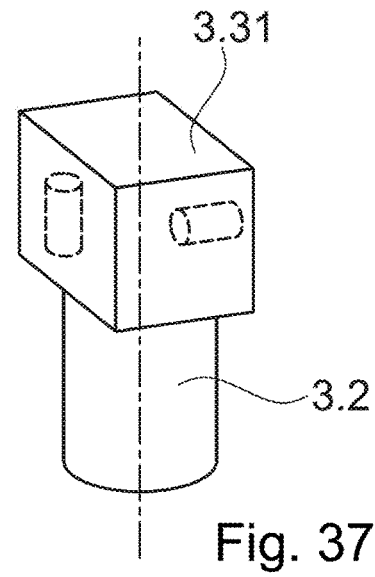

In the embodiment of FIG. 37, the connector instead of the plate-like body portion and the walls (ribs) shown in FIGS. 33*a*-36, the connector has a closed housing 3.31 that is either itself off-center with respect to the insertion axis or that houses a functional structure that is off-center with respect to this axis, or both.

In FIG. 37, the functional structure that is off-center with respect to the axis (shown as dash-dotted line) is not a connecting structure but an other functional part. FIG. 37 very schematically illustrates two parts shown in dotted lines within the housing. Such functional structure may comprise a sensor, an antenna, a light source, a camera, an acoustic converter etc.

Embodiments with a closed housing as shown in FIG. 37 may be provided with means for coupling the vibration energy from the proximally facing end face of the housing to the anchoring portion, for example tube portion 3.2. FIG. 56 illustrates an example of a connector 3—that in the depicted embodiment has a connecting peg 3.16—of which the tube portion 3.2 extends through the housing to the proximal end face of the connector. The housing in this may be open towards distally. If the housing is open towards distally, the abutment portion of the functional portion is constituted by the distal edges of the vertical walls of the housing.

Other solutions of coupling vibration energy from the proximal end face into the anchoring portion are possible, such as vertical reinforcing walls extending through the housing or other vertical structures.

Figure 38:
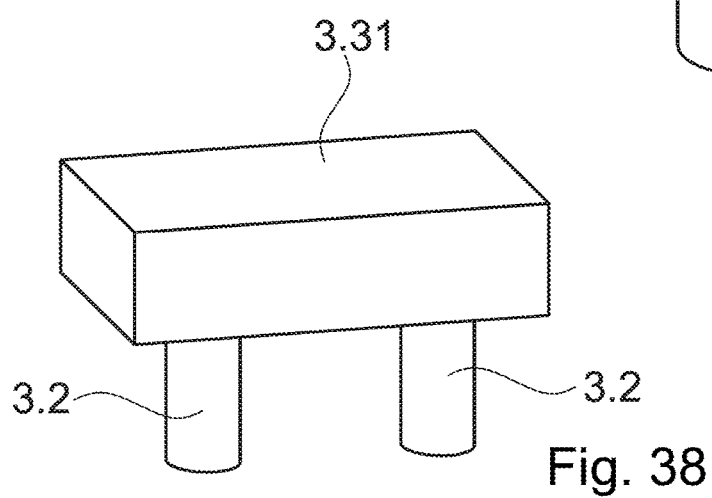

FIG. 38 illustrates that instead of one tube portion with a punching edge, the connector may comprise a plurality of cutting elements. In FIG. 38, each of these cutting elements is constituted by a tube portion with a distal punching edge.

The embodiments of connectors shown in FIGS. 6, 7, 19, 20*a*-21, 23 and others comprise a distal end section that is deformed in the process, especially collapsible towards the outside. Depending on the material composition of the first object and the dimensions, especially depending on the thickness of a tube portion/distal end section of the connector and a thickness (proximodistal extension) of the first object, the control of such collapse may be an issue, and measures for exerting such control may be taken.

In addition or as an alternative, it may be desirable to ensure that the flow portion of the thermoplastic material does not only penetrate structures distally, near the second outer building layer but also flows immediately distally of the first building layer, firstly for an increased interpenetrated volume and secondly to create a rivet-like effect. For example the embodiments of FIGS. 7, 16*c*, 23 are examples of embodiments that comprise measures for such flow of thermoplastic material at more proximal positions.

Generally, also the question whether the flow portion does flow immediately distally of the first building layer or not depends on the named dimensions, and in embodiments it may be desirable to influence this.

Figure 39:
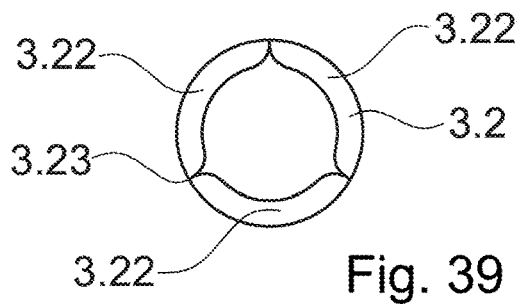
FIGS. 39-43 further connectors.

The embodiment of a connector shown in FIG. 39 is an example of a connector having a plurality of legs, but in contrast to FIGS. 20*a*, 20*b* and 21 or also FIG. 25*a*-25*b*, the legs 3.22 are initially connected by at least one bridge portion 3.23 that during the process serves as a predetermined breaking point.

Figure 40:
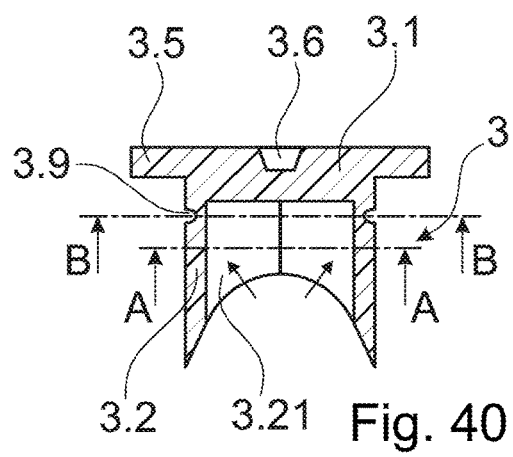

In the embodiment of FIG. 40, the tube portion is stabilized by at least one stabilizer rib 3.21. Especially if the outer building layers are comparably strong, such stabilizer structure may prevent the tube portion (that optionally may comprise a plurality of legs, as for example illustrated in FIG. 39 or in FIG. 21) from collapsing during the initial stage of displacing a portion of the first outer building layer.

As also illustrated in FIG. 40, the stabilizer structure may in addition be shaped so as to exert an outwardly (with respect to radial directions) directed pressure during the subsequent step of pressing the connector into the lightweight building element. The bow-shaped, concave contour in the illustrated example will cause such outward pressure when the connector is pressed into interlining material, as illustrated by the arrows in FIG. 40.

Figure 40A:
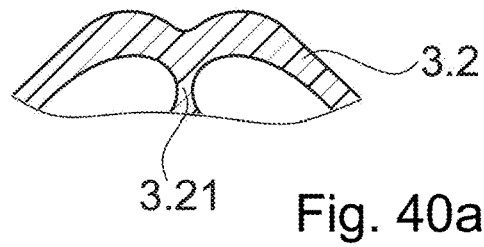

FIG. 40*a*, showing a detail of a possible cross section along the plane A-A in FIG. 40, illustrates that the tube portion 3.2 of a connector does not need to be circular in cross section. Rather, in the embodiment of FIG. 40*a*, the connector has an axially running notch at the position where a stabilizer rib 3.21 is connected to the tube portion 3.2. By this, an outward pressing of the thermoplastic material of the tube portion by the directed pressure may be favored.

Figure 40B:
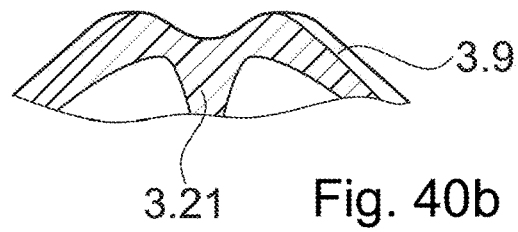

FIG. 40*b* shows a detail of a possible cross section along the plane B-B in FIG. 40. The circumferential groove 3.9 need not necessarily run around the entire periphery but may be interrupted, especially where a stabilizer rib 3.21 is connected to the tube portion.

Figure 41:
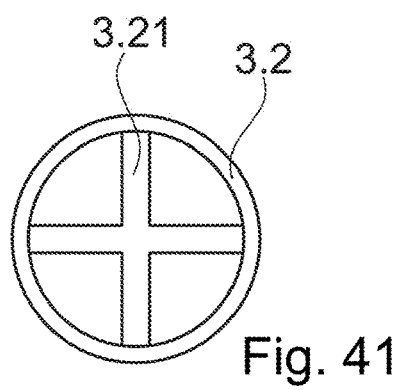

FIG. 41 shows a possible horizontal cross section through a connector. The combination of a circular geometry and the stabilizer ribs 2.21 in a crossed arrangement is especially stable.

Figure 42:
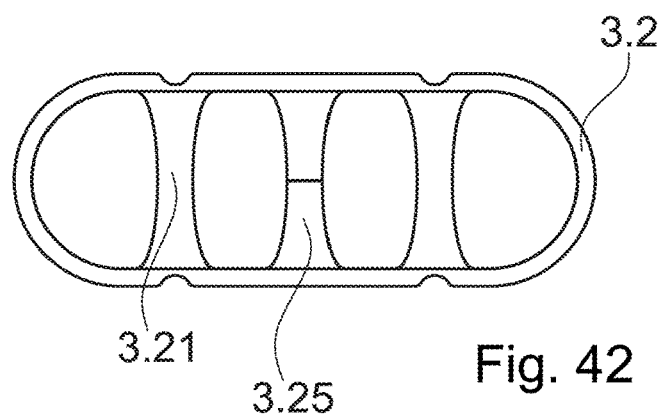

FIG. 42 illustrates a cross section of a cross section through an alternative anchoring portion, which anchoring portion does not have circular symmetry but is oblong in cross section. In such embodiments, especially a stabilizer structure, such as a stabilizer rib 2.21 arranged as shown in FIG. 42 may be advantageous.

Figure 43:
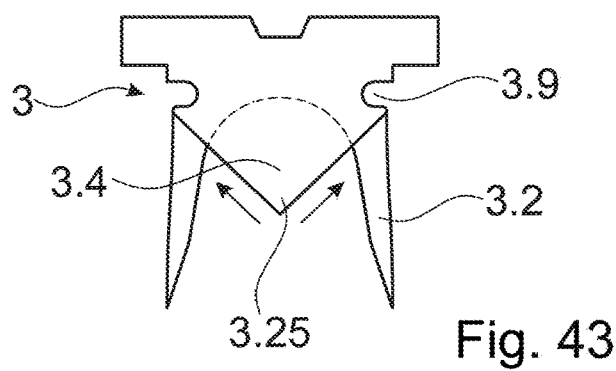

FIG. 43 illustrates a connector that has a stabilizer rib 3.21 that is pointed towards a distally facing tip 3.25 or edge so that interlining material penetrated by the connector during the process is forced into the direction of the arrows and thereby exerts an outward pressure on the tube portion 3.2 or the legs, respectively.

The connector of FIG. 57 has a cross section step 3.52 formed by an inwardly facing shoulder 3.51 that defines a collapse zone instead of the groove described hereinbefore. A collapse zone defined by a cross section step instead of by a groove may have the advantage of being more easy to manufacture by an injection molding process.

Similarly to the embodiment of FIG. 40, the connector 3 of FIG. 57 has at least one reinforcing rib 3.21. FIGS. 57*a* and 57*b* show two possible alternative cross sections through pane A-A in FIG. 57. Whereas the embodiment of FIG. 57*a* comprises a notch at the position where the reinforcing rib is connected to the tube portion 3.2, in the embodiment of FIG. 57*b* the connector has an outward bulge at the corresponding position. Thereby, in the embodiment of FIG. 57*a* a collapse toward outwardly is predominantly favored at positions different from the position where the reinforcing rib meets the tube portion 3.2, whereas in the embodiment of FIG. 57b a collapse towards outwardly is (also) favored at this position.

FIG. 57 also illustrates the principle that the displaced portion 1.7 (punched-out portion) that may be relatively stiff may also contribute to the outward pressure on the thermoplastic material at more proximal positions, especially at positions immediately distally of the first outer building layer 1.1. Namely, the displace portion by being pressed towards distally into interlining layer material will exert a counterforce on the connector. If the connector is appropriately shaped, such as by the reinforcing rib 3.21 being concave as shown in FIG. 57, this may cause a spreading effect as illustrated by the arrow in FIG. 57.

Figure 44:
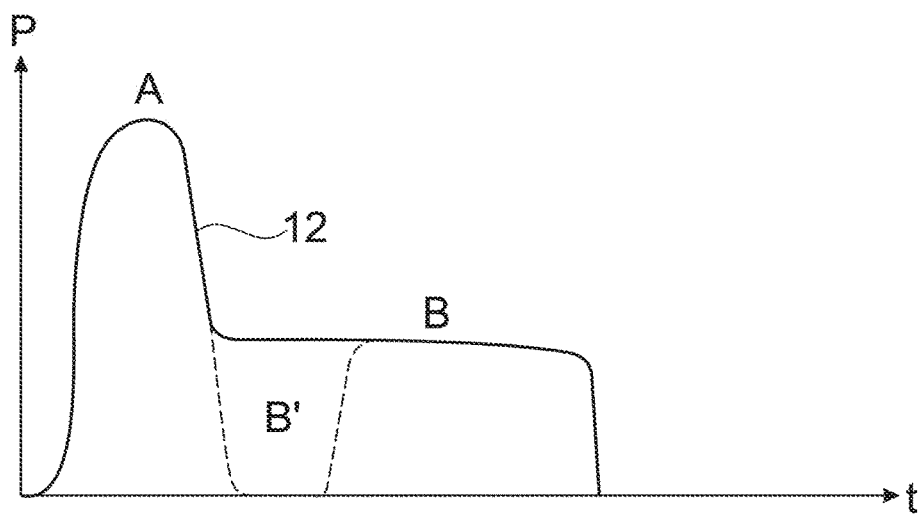
FIG. 44 an other process diagram.

FIG. 44 illustrates that in addition or an alternative to the connector shape also the process parameters may be used to assist liquefaction of thermoplastic material portions not only at the distal end but also more proximally. FIG. 44 schematically shows the vibration power 12 as a function of time. During an initial stage A, the vibration power—and hence the vibration amplitude—is high, until the connector is forced through the first outer building layer. Then, in a second stage B, the power is substantially reduced. Thereby, the process is slowed down and the material at the distal end is allowed to liquefy and to flow so that it becomes less sharp and advancement towards distally is slowed or even stopped, whereby energy absorption more proximally is enhanced. Optionally, in an intermediate phase B' (dotted line), the energy input is stopped between the first and second phases so that the material at the distal end may even re-solidify to some extent.

Figure 45:
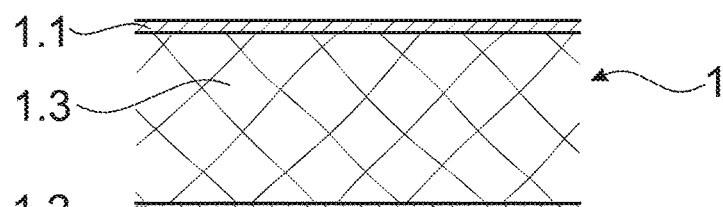
FIG. 45 an alternative lightweight building element.

FIG. 45 very schematically depicts an example of an alternative first object being a lightweight building element that has an interlining layer 1.3 of less thickness and of enhanced density compared to the first objects discussed hereinbefore.

Such lightweight building elements exist for example with interlining layers being a light porous structure comprising a thermoplastic material. As an example, lightweight building elements For example, there exist lightweight building elements with fleece-like outer building layers, for example of wood/Polypropelene (PP) or glass fiber-PP composite and with a PP structure, such as PP honeycomb structure, as interlining layer.

Figure 46:
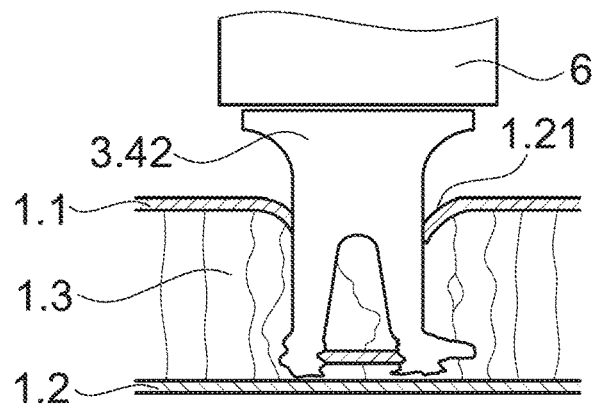
FIG. 46 a configuration an arrangement with a connector, a first object and a sonotrode during the process.
Figure 47:
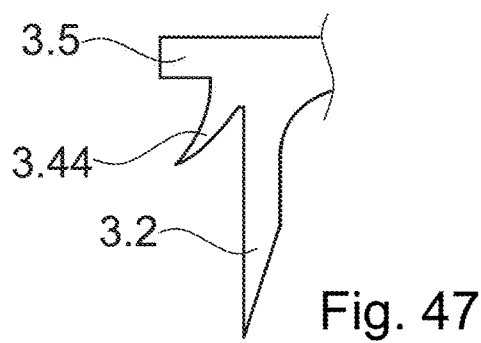
FIGS. 47 and 48 details of a connector.
Figure 48:
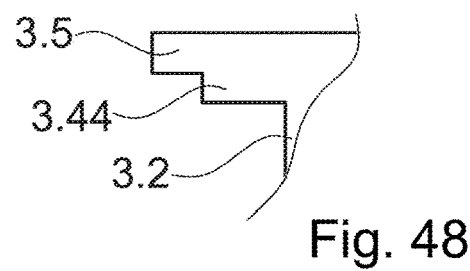

FIG. 46 illustrates that in some lightweight building elements with outer building layers of reduced hardness, the first outer building layer 1.1 may be locally deformed around the location where the connector breaks through it. To compensate for such deformation, the connector may optionally have head portion 3.42 with a concave distally facing surface.

Figures and 48 illustrate the option of providing the connector with a proximal distally facing fusion edge 3.44 that is located and shaped to be pressed against the first outer building layer towards the end of the anchoring process and to thereby become liquefied and interpenetrate structures of the first outer building layer and/or to fuse with material of the first outer building layer and/or of the interlining layer so as to form a weld.

In addition or as an alternative to this, in embodiments that comprise a thermoplastic linterlining layer, the anchoring may comprise a weld between thermoplastic material of the connector and thermoplastic material of the interlining layer in addition to the interpenetration of structures.

Figure 49A:
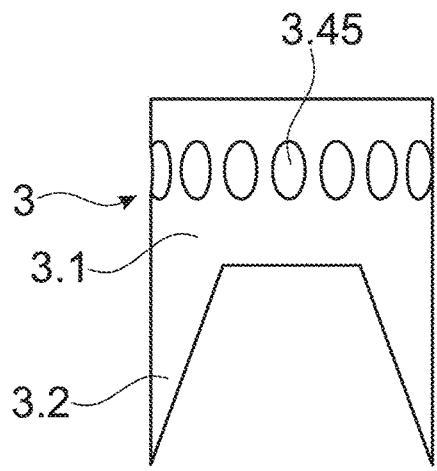
FIGS. 49a and 49b an other connector during two different stages of the process.
Figure 49B:
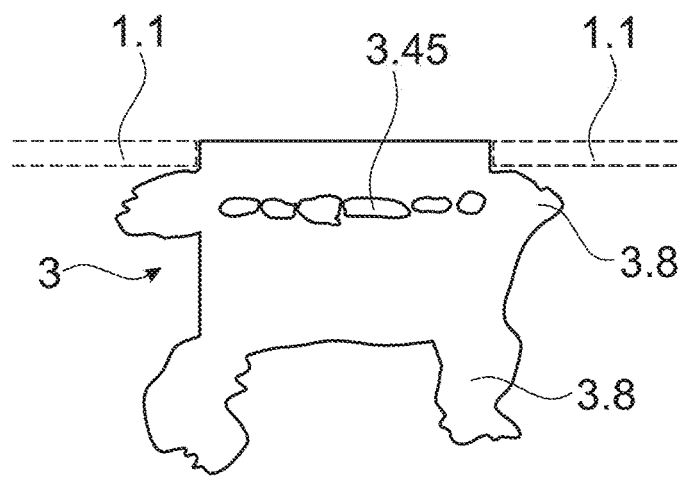

FIGS. 49a and 49b show a further embodiment of a collapsible connector, in an initial stage and after the energy input, respectively. The connector comprises, in a proximal region, a plurality of openings 3.45. The fact that between the openings the connector material is weaker will cause an energy concentrating effect. If the inner friction within the thermoplastic connector material is sufficiently high, liquefaction will set in in a region of the openings, in addition to the distal end. The flow portion 3.8 therefore has a portion at the distal end and in addition has a portion at the height of the openings. This can be used to cause a radial flow immediately distally of the first building layer 1.1 if the openings 3.45 are accordingly arranged. FIG. 49b shows the position of the first building layer 1.1 after the process in dashed lines.

As mentioned hereinbefore, in embodiments the process may be carried out so that after an initial stage, a distal flow portion is allowed to re-solidify by the energy input stopping after the connector has reached a certain position and that in a further step the energy input is started again, whereby energy absorption will be concentrated in regions between the openings 3.45 so that the collapse as shown in FIGS. 49a and 49b is initiated or continued.

Figure 50:
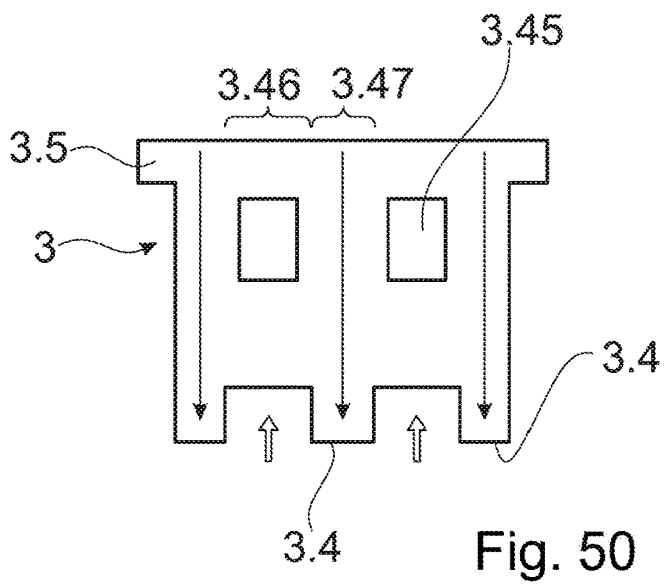
FIGS. 50 and 51 an even further connector and a detail of a variant thereof, respectively.

FIG. 50 shows a variant of a connector 3 in which the openings 3.45 are arranged in collapse zones 3.46 whereas between the collapse zones 3.46 there are force transmitting zones 3.47. The force transmitting zones comprise the distally facing punching edge 3.4 that breaks through the first outer building layer during the initial stage of the process.

Figure 51:
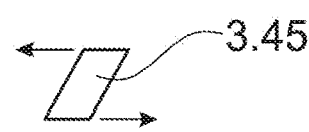

FIG. 51 schematically illustrates the principle that the shape of the openings 3.45—that may be through openings—may be used to generate forces into radial or circumferential directions. The shape of the opening 3.45 shown in FIG. 51 is rhomboid in cross section so that a pressing force in the axial direction (top-down-direction in FIG. 51) generates shear forces in direction perpendicular to the axial direction.

Figure 52:
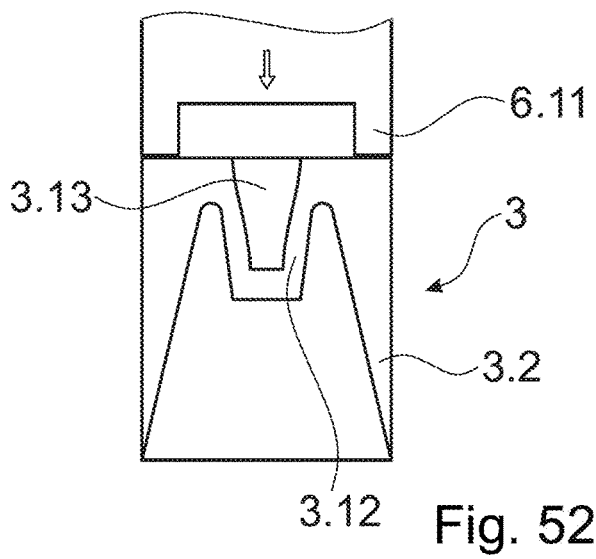
FIG. 52 an arrangement of a connector and a sonotrode.

FIG. 52 shows an embodiment of a connector that is similar to the embodiment of FIG. 32. Depending on the material strengths of the materials involved, the connector 3 having a fastening hole 3.13 and/or other structure that requires a precise definition may feature the challenge that such precise definition structure must not collapse during the process by the energy input.

The arrangement of FIG. 52 shows a first possible solution to this problem. The sonotrode 6 has a protruding feature, namely a circumferential protrusion 6.11, whereby the sonotrode is only pressed against peripheral portions of the connector 3, which portions have lateral positions corresponding to the positions of the tube portion 3.2 so that the pressing force is only coupled into the connector where it can be directly transferred to the punching distal end. A central portion is unaffected by the pressing force, and hence the region around the fastening hole 3.13 may remain relatively stable.

Figure 58:
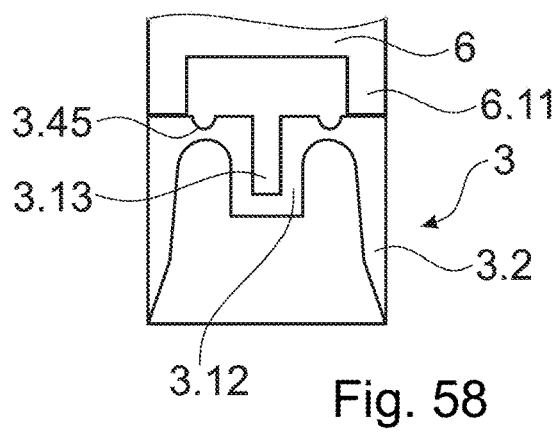
FIGS. 58 and 59 even further connectors.

In the variant of FIG. 58, the connector 3 has a joint 3.45 that connects a central portion constituted by the fastener receiving portion 3.12 and a peripheral portion that includes the tube portion 3.2. The joint is constituted by a local thinning making some elastic deformation between the central portion and the peripheral portion possible. The sonotrode 6 only impinges on the peripheral portion, and thereby, when the central portion encounters mechanical resistance—for example by the displaced portion of the first building layer, which displaced portion encounters resistance by the compacted interlining layer—the joint 3.45 will de-couple the central portion from the peripheral portion with respect to mechanical vibration, i.e. the mechanical vibration will essentially not be coupled into the central portion.

The concepts illustrated referring to FIGS. 52 and 58 may individually or in combination be an option for other embodiments and principles described in this text, including, but not limited to, the embodiments and principles illustrated referring to FIGS. 28-31.

Figure 53:
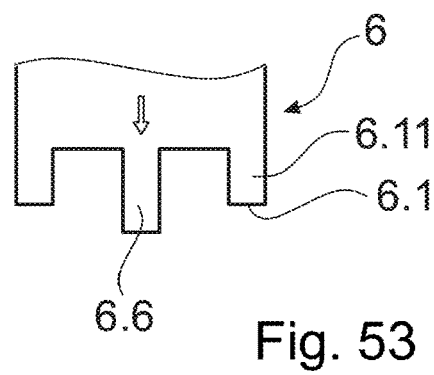

FIG. 53 shows a sonotrode for a variant of the configuration of FIGS. 52 and 58, which sonotrode in addition to the circumferential protrusion 6.11 has a central guiding protrusion 6.6 cooperating with the fastening hole or a dedicated guiding structure of the connector. Such guiding protrusion 6.6 in addition to guiding the connector relative to the sonotrode also has the effect of stabilizing the indentation it engages, for example the fastening hole.

A still further variant of a sonotrode 6 is shown in FIG. 54. This variant of the sonotrode of FIG. 52 has a central pushing portion 6.12 that is connected to the body of the sonotrode via a spring 6.13. Thereby, it is equipped for exerting a controlled pushing force on the central portion of the connector, the pushing force being defined by the spring constant. Thereby, a pushing force is not only exerted via the contact face but also on the central portion. This may especially be advantageous if during application of the second pushing force the central portion is expected to be subject to substantial resistance. The pushing force on the central portion may balance such resistance force at least to some extent.

However, the central pushing portion 6.12 by the spring is essentially de-coupled from the sonotrode body in that it does not transmit mechanical vibration energy. Thereby, the central portion of the connector that has the fastening hole or other precisely defined structure is gently pushed into the first object together with the peripheral portion while unnecessary energy input and liquefaction of the central portion is avoided.

The variant of FIG. 55 in addition to the features of the embodiments of FIGS. 52 and 53 (optional guiding protrusion 6.6) has a further feature. Namely, in some embodiments the connector needs to have a defined proximally facing surface, for example if a screw or other fastener engages with the fastening hole, wherein a distally facing fastener head face abuts against the proximally facing surface. Similarly, an other element secured to the fastener and thereby to the first object may be placed against proximal fastener surface, which then needs to be precisely defined. However, in the process of pressing and coupling energy into the connector, depending on operation parameters, some material of the connector may melt in immediate contact with the sonotrode 6, and this may lead to bulges next to the contact face between the sonotrode and the connector, which bulges cause the proximal end of the connector to be not precisely defined.

The connector 3 of the embodiment of FIG. 55 therefore has, around the fastening hole 3.13, a proximal protrusion 3.41 with a proximal end face. The contact face between the sonotrode and the connector—defined by the circumferential protrusion 6.11 of the sonotrode—is distally of the proximal end face of the proximal protrusion 3.41. Therefore, bulges formed near this contact face do not have an influence on the definition of the proximal end of the connector.

In FIG. 55, the dashed line shows the position of the first building layer 1.1 after the process.

Generally, in many embodiments the process may be carried out until an upper (proximal) surface of the connector is flush with the proximal surface of the first building layer, or, as shown in FIG. 55, until at least a portion of the proximal surface is so.

In embodiments, depending on the properties of the first building layer 1.1, the first building layer in the process will fold inwardly around the created hole. A protruding collar 3.5 of the kind for example shown for example in FIG. 16*c*, FIG. 23, FIG. 30, FIG. 40 or FIG. 50 may in such embodiments instead of serving as stop feature as illustrated referring to FIG. 2 be pushed into the first object 1 also and at the same time serve for closing off the created hole. In embodiments, this closing off may be such that the collar 3.5 may serve as sealing portion.

Figure 59:
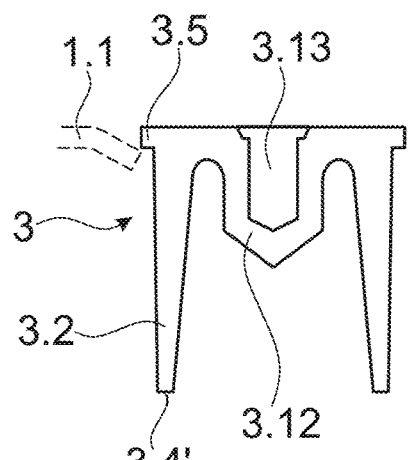

FIG. 59 shows an other embodiment of a connector 3 as well as, in dashed lines, a possible position of the first building layer 1.1 after the process. As becomes clear from FIG. 59, the functional part of the connector after the process is distally of the proximal surface plane of the first object, i.e. "inside" the first object. The functional part in FIG. 59 comprises a fastener receiving portion 3.12, but this teaching may apply to any other functional part also.

An other special feature of the embodiment of FIG. 59, which is independent of the other properties of this embodiment and is an option for other kinds of connectors, too, is the shape of the distal end of the tube portion 3.2. Namely, in contrast to previously described embodiments, the distal end that forms a punching edge is not a sharp edge but is a blunt edge 3.4'. In FIG. 59, the distal end is shown to have a flat end face that forms the blunt punching edge 3.4'. It has been found that for some materials of first building layers, a blunt punching edge is sufficient for punching, and it may even be advantageous to prevent the distal end of the connector from liquefying at a too early stage of the process.

Figure 60:
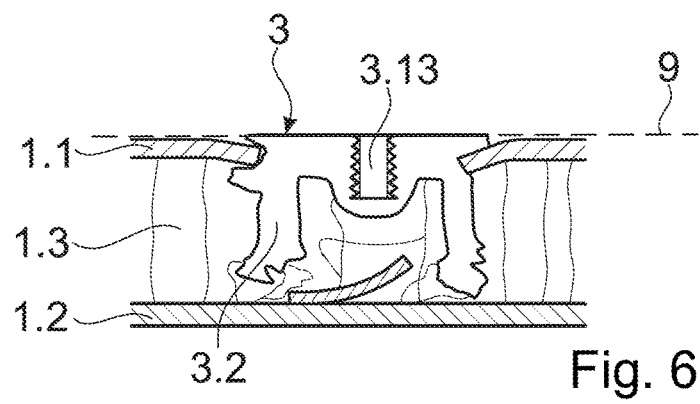
FIG. 60 a connector anchored in a first object.

FIG. 60 illustrates the principle that essentially the entire connector may be pressed into the first building layer, with the proximal end face of the connector 3 being approximately flush with the proximal surface plane 9 of the first object.

Figure 61:
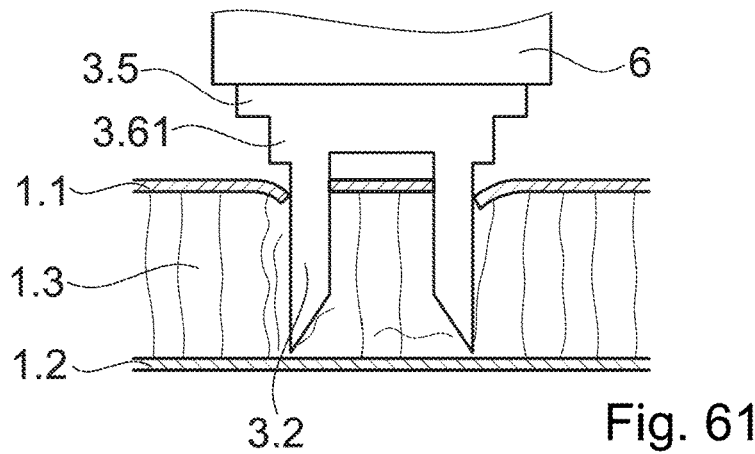
FIG. 61 a further connector together with a sonotrode and a first object during the process.

FIG. 61 shows an embodiment of a connector that in addition to the collar 3.5 has a step feature forming a shoulder of the tube portion 3.2 on the radial-outer side. This step feature will come into physical contact with the first building layer 1.1 as soon as the connector has advanced into the first object 1 to a sufficient extent, especially towards the end of the forward (towards distally) movement. As a consequence, due to friction between the vibrating connector and the first building layer 1.1 energy will be absorbed, and thermoplastic material of the connector becomes flowable near the first building layer. The flow portion will therefore comprise portions in a proximal region and especially immediately distally of the first building layer. This may come in addition or as an alternative to the measures for example described referring to FIGS. 16*a*-16*c* 23, 39-43, 47-50, 57-57*b*, which measures also contribute to a generation of a flow portion and a radial flow immediately distally of the first building layer 1.1.

Figure 62:
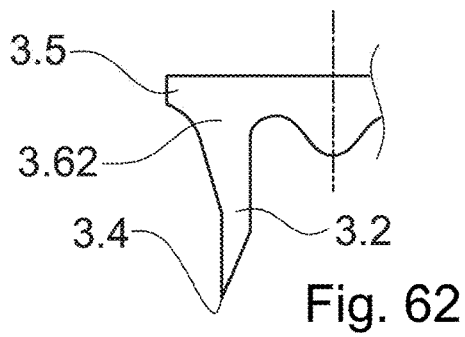
FIGS. 62 and 63 details of further connectors.

In addition or as an alternative to an outward step 3.61, the connector 3 may comprise an outward taper 3.62, as shown in FIG. 62.

Figure 63:
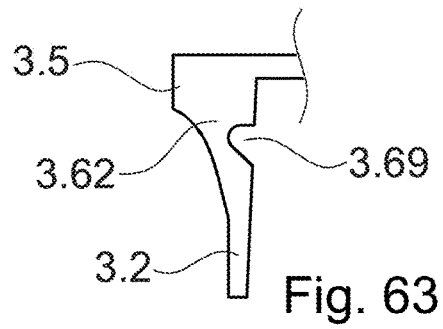

Optionally, in addition to such outward feature (step 3.61, taper 3.62), the connector may comprise an inner feature, such as an inner groove 3.69 assisting the collapse immediately distally of the first building layer. FIG. 63 illustrates an example. Other structures, including measures described hereinbefore, may optionally be combined with this.

Figure 64:
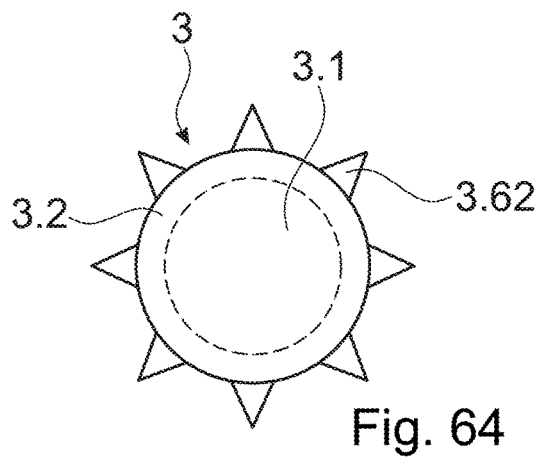
FIG. 64 view of the embodiment of FIG. 62.

FIG. 64, schematically illustrating a top view (view from the proximal side) of the connector 3 shows the principle that the mentioned outward features (step, taper 3.62) may be formed as radial protrusions, for example distributed around the periphery. As an alternative, such outward features may also be circumferential, i.e. extend continuously around the periphery.

The outward features of the kind discussed referring to FIGS. 61-64 may cause involving the first building layer 1.1 in the process of making thermoplastic material flowable and possibly causing a collapse of the connector.

Figure 65:
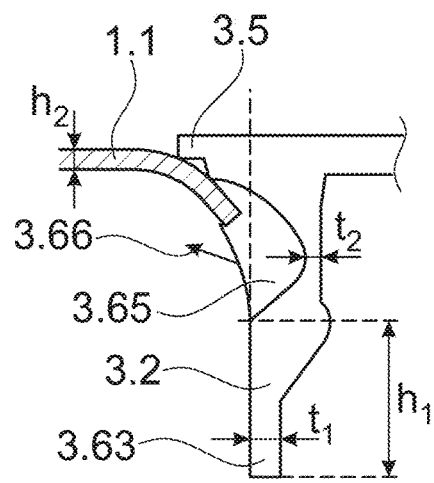
FIG. 65 a detail of an even further connector and a first building layer.

Optional design principles for connectors 3 having such outwards features are discussed referring to FIG. 65.

A possible first principle is that the height $h_1$ of the portion that does not comprise the outward feature, i.e. of the portion where the outer surface is cylindrical (this does not necessarily imply the shape of a rotational cylinder) is greater than a piercing height $h_2$. The piercing height $h_2$ is always greater than or equal to the thickness of the first building layer 1.1 and may for example correspond to the cumulated thickness of the first building layer and an enhanced density adhesive layer immediately distally of it, which adhesive layer needs to be pierced also.

In FIG. 65, reference number 3.65 denotes a proximal liquefaction zone in which the thermoplastic material is made flowable due to the friction with the first building layer 1.1. From this proximal liquefaction zone 3.65, the thermoplastic material will flow outward (arrow 3.66) when the connector collapses, to form the proximal portion of the flow portion.

A second possible principle is that the thickness $t_1$ of the tubular portion 3.2 is greater than a thickness $t_2$ of thermoplastic material remaining radially-inwardly of the proximal liquefaction zone 3.65. This may ensure that the collapse takes place near the proximal liquefaction zone 3.65.

Figure 67:
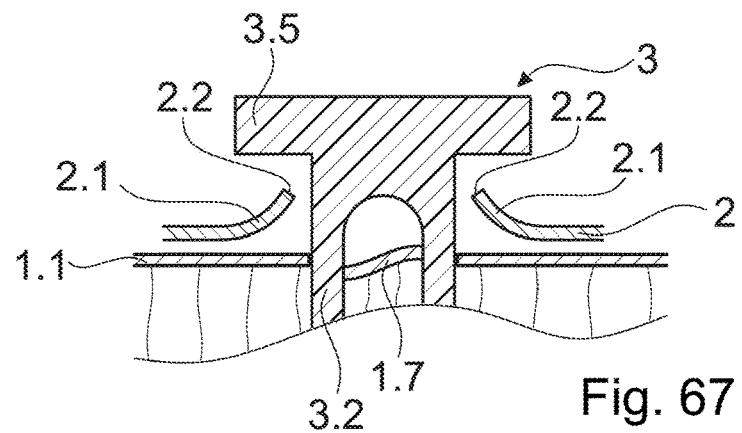
FIGS. 67 and 68 a detail of an arrangement including a second object during two different stages of the process.

FIG. 67 goes back to the principle of FIGS. 2, 17, 27 of using a laterally protruding proximal feature (proximal broadening), namely a collar 35 in the illustrated embodiment, to affix a second object 2 to the first object 1. In contrast to the embodiments of other features, the second object 2 around the opening through which the connector 3 is inserted has a section 2.1 projecting away from the plane defined by the first building layer 1.1 towards proximally. The a distal surface of the collar 35 towards the end of the anchoring process is pressed against the edge 2.1 that is formed around the opening while mechanical vibration energy keeps being coupled into the connector. Thereby, after re-solidification, in addition to the anchoring achieved more distally in the hereinbefore discussed manner, the connector is also secured to and anchored with respect to, the first object by the edge becoming embedded in thermoplastic material of the connector. Also, if the edge is embedded continuously all around the opening, a sealing effect is achieved.

Figure 68:
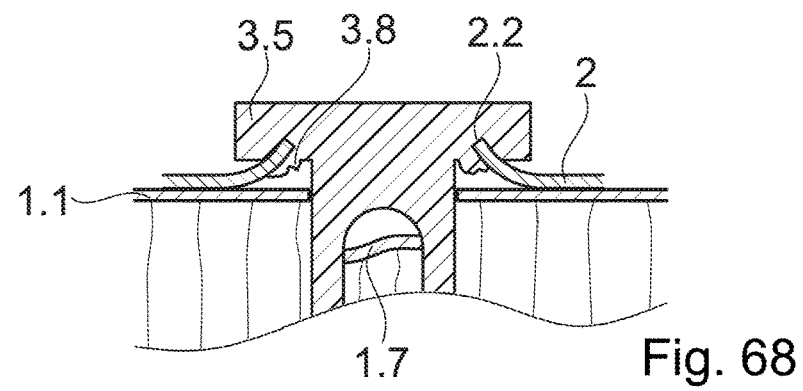

FIG. 68 depicts, in part, the resultant arrangement.

Figure 69:
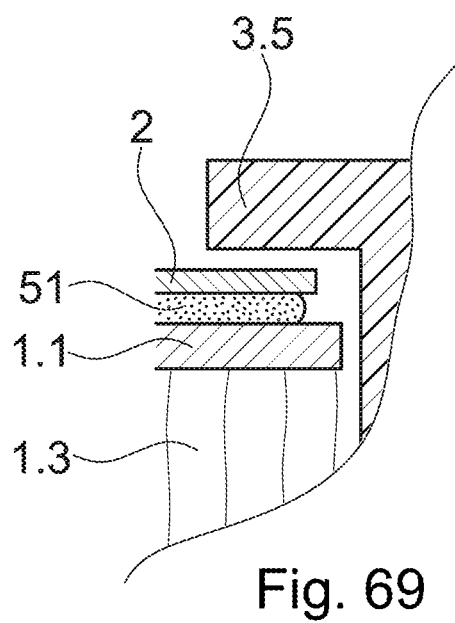
FIGS. 69 and 70 a detail of an alternative arrangement including a second object during two different stages of the process.

FIG. 69 schematically illustrates a further variant (the feature of which may be combined with the concept shown in FIGS. 67/68. Namely, an adhesive 51, for example in a flowable state, is applied between the first and second objects.

Thereby, an adhesive connection and the concept of securing the second object by a connector according to the invention are combined. This may for example be useful if in a manufacturing process the second object is glued to the first object by the adhesive, but the assembly of the first and second objects are to be processed immediately after having been assembled together. The connector applied according to the invention provides initial stability sufficient for subsequent production steps.

The energy input and pressing force during the final stage of the hereinbefore described anchoring process may cause a flow of the adhesive applied between the first and second objects (and/or between the distal surface of the collar 3.5 and the second object, in special embodiments). This may be used in the following manner:

A gap or fractures/fissures etc. between the first building layer 1.1 and the connector 3 may be filled by the adhesive and thereby 'healed'. This is illustrated in FIG. 70.

Figure 70:
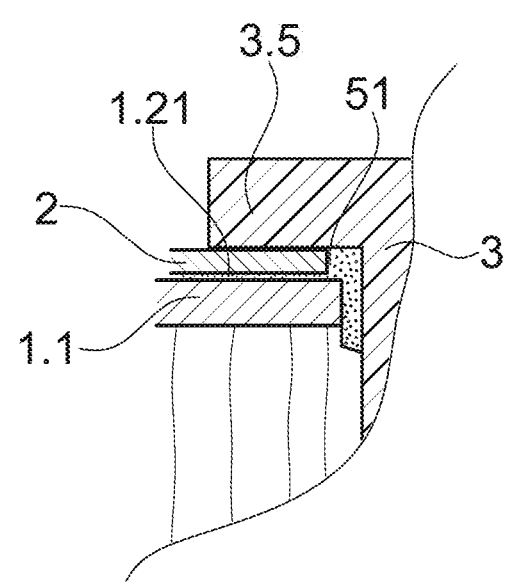
Figure 71:
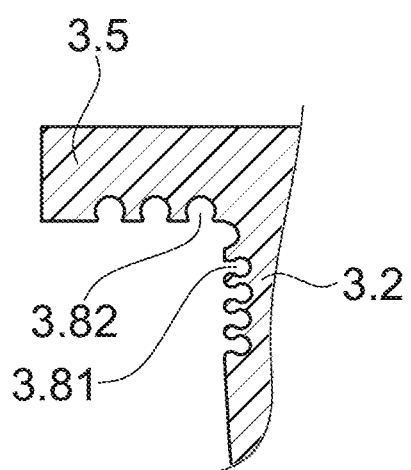
FIG. 71 a detail of a connector.

In addition or as an alternative, roughness 1.21 of the first building layer 1.1 is caused to be interpenetrated by the adhesive 51, thereby enhancing the stability of the adhesive connection (see also FIG. 70).

In addition or as yet another alternative, macroscopic or microscopic surface structures of the connector may be interpenetrated by the adhesive to enhance the stability of the connection. Such surface structures may be present on a lateral surface of the essentially cylindrical portion (FIG. 71, reference No. 3.81) and/or on a distal surface of the proximal laterally protruding feature (here: collar 3.5; reference No. 3.82).

Figure 72:
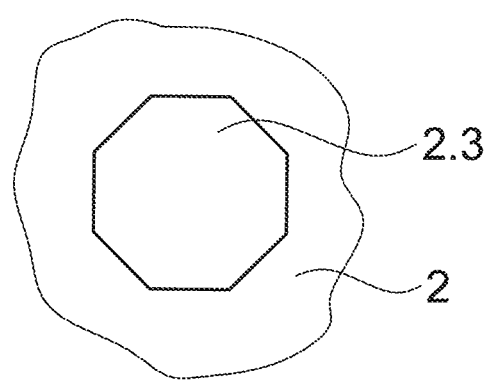
FIG. 72 a second object with an opening that is not round.

FIG. 72 yet schematically illustrates the principle of a through opening 2.3 in the second object 2 that is not round and hence not symmetrical with respect to rotation around the proximodistal axis. This may be either in the configuration of FIGS. 67/68 or in configurations as illustrated in the other figures showing a second object 2, with the second object having an essentially plane portion around the opening 2.3.

By the through opening not being round, the connector is secured against rotational movements relative to the second object (and thereby in many embodiments also relative to the first object, for example if the second object is secured to the first object in a plurality of locations) in a positive-fit manner.

What is claimed is:

1. A method of anchoring a connector in a first object, wherein the first object is a lightweight building element having a first outer building layer and an interlining layer, the first outer building layer being thinner and more dense than the interlining layer, wherein the connector comprises thermoplastic material in a solid state, the method comprising the steps of:

bringing a distally facing surface portion of the connector into contact with an attachment location of the first outer building layer;

displacing a portion of the first outer building layer at the attachment location with respect to the interlining layer by applying a first pressing force to the first outer building layer and causing the first outer building layer to be pierced at the attachment location or in a vicinity thereof and causing the portion of the first outer building layer to be punched out by the effect of the first pressing force;

applying a second pressing force to the connector and coupling energy into the connector, and thereby moving the connector into a distal direction relative to the first object until a flow portion of the thermoplastic material has liquefied and flowed to interpenetrate structures of the interlining layer; and stopping the energy transfer coupling and allowing the flow portion to re-solidify.

2. The method according to claim 1, wherein the step of applying the first pressing force to displace the portion of the first outer building layer comprises displacing the portion of the first outer building layer towards a distal direction, thereby causing material of the interlining distally of the portion of the first outer building layer to be compressed.

3. The method according to claim 1, wherein the step of displacing the portion of the first outer building layer is carried out after the step of bringing the distally facing surface portion of the connector into contact with the attachment location of the first outer building layer, by applying the first pressing force to the connector resting against the first outer building layer.

4. The method according to claim 3, wherein during the step of applying the first pressing force, energy is coupled into the connector, and wherein the energy coupled into the connector during the step of applying the first pressing force and the energy coupled during the step of applying the second pressing force is mechanical vibration energy.

5. The method according to claim 1, wherein the step of displacing the portion of the first outer building layer is carried out, prior to the step of bringing the distally facing surface portion of the connector into contact with the attachment location, by a pressing tool until the first outer building layer is pierced.

6. The method according to claim 1, wherein the connector has a head portion or other laterally protruding proximal feature, and wherein the head portion or the other laterally protruding proximal feature serves as a stopping feature, wherein the energy coupling is stopped as soon as a distally facing surface portion of the head portion or the other laterally protruding proximal feature comes into physical contact with the first outer building layer or with the proximal surface of a second object.

7. The method according to claim 1, comprising a further step of applying a third pressing force which is larger than the second pressing force after the step of applying the second pressing force and prior to stopping the energy coupling.

8. The method according to claim 1, comprising further steps of providing a second object with an opening, and of placing the second object relative to the first object,
wherein in the step of bringing the distally facing surface portion of the connector into contact with the attachment location of the first outer building layer, a shaft portion of the connector is caused to extend through the opening of the second object, and
wherein after the step of stopping the energy coupling, the second object is clamped between the first object and the distally facing surface portion of the connector.

9. The method according to claim 1, comprising the additional step of maintaining the second pressing force for some time after the step of stopping the energy coupling.

10. The method according to claim 1, wherein the first object comprises a second outer building layer, the first and second outer building layers sandwiching the interlining layer, wherein the second pressing force, and if applicable, a third pressing force, are chosen so that the second outer building layer is not penetrated by the connector, and wherein the second outer building layer has a distally facing outer surface, and wherein the distally facing outer surface is left intact.

11. The method according to claim 1, wherein in the step of bringing the distally facing surface portion of the connector into contact with the attachment location, a guiding portion of the connector is caused to protrude into a positioning hole of the first outer building layer, or wherein at least the second pressing force is applied by a tool comprising a guiding structure cooperating with a complementary guiding structure of the connector to define a lateral (x-y) position of the connector relative to the tool, the tool being a sonotrode.

12. The method according to claim 1, wherein the connector comprises a distally facing piercing and/or punching structure, wherein the piercing and/or punching structure is thermoplastic, and wherein the piercing and or punching structure is caused to become flowable by the step of applying the second pressing force to the connector and coupling the energy into the connector.

13. The method according to claim 1, wherein the connector comprises a distally facing piercing and/or punching structure, wherein the piercing and/or punching structure at least partially belongs to a non-liquefiable portion of a non-liquefiable material, the step of applying the second pressing force to the connector and coupling energy into the connector causes the connector to be pressed distally forward and the non-liquefiable portion to be pushed proximally back relative to the thermoplastic material.

14. The method according to claim 1, wherein the connector comprises a distally facing piercing and/or punching structure, and wherein the displaced portion of the first outer building layer and/or other material of the first object is caused to shield the piercing and/or punching structure after the step of displacing the portion of the first outer building layer.

15. The method according to claim 1, wherein the connector comprises an anchoring portion and a functional structure, wherein the functional structure is a connecting structure defining a connecting location.

16. The method according to claim 1, wherein at least one of the following conditions is fulfilled:
the connector comprises a plate-like body, from which an anchoring portion protrudes towards distally, and proximally whereof a functional structure is arranged, wherein the plate-like body comprises a proximally facing coupling-in face into which the second pressing force is coupled;
the connector has a distally facing abutment face, and moving the connector into a distal direction relative to the first object stops in a condition in which the abutment face rests against a corresponding proximally facing surface portion of the first object; and
the functional structure is off-center with respect to an insertion axis, and the method comprises a further step of:
fixing an orientation of the connector relative to the insertion axis during
the step of applying the second pressing force.

17. The method according to claim 1, wherein at least the first pressing force is applied by a tool, and wherein a distal end of the tool and a proximal end of the connector are adapted to each other so that a contact face between a distal coupling-out face of the tool and a proximal coupling-in face of the connector is restricted to a fraction of a proximal surface of the connector.

18. The method according to claim 17, wherein at least one of the following conditions is fulfilled:
the contact face is ring shaped;
the contact face is restricted to regions an in-plane position of which corresponds to positions of the distally facing surface portion;
the tool comprises a distal protrusion, a distal end of which forms the coupling-out face; and
the connector comprises a proximal protrusion with a proximal end face proximally of the contact face.

19. The method according to claim 1, wherein the first and second pressing forces are both applied by a same tool, wherein the tool is a sonotrode, and wherein in the step of applying the second pressing force and coupling energy into the connector, the sonotrode is caused to vibrate, whereby at least a fraction of the energy is coupled into the connector.

20. The method according to claim 1, and causing, by the energy, coupled into the connector, a weld between thermoplastic material of the connector and material of the interlining layer and/or of the first outer building layer.

21. The method according to claim 1, and causing, by the coupling of the energy, a flow portion part of thermoplastic material of a proximal portion of the connector to be made flowable and to flow radially outwardly into a region distally of the first outer building layer, wherein the flow portion part is caused to be in physical contact with the first outer building layer.

22. The method according to claim 1, further comprising causing a radially outer portion of the connector to be pressed against an edge of a remaining first outer building layer after the portion of the first outer building layer has been punched out, while the energy is coupled into the connector, until thermoplastic material of the connector is made flowable at an interface between the edge and the connector, and is caused to flow relative to the connector and the edge.

* * * * *